United States Patent [19]
Pei et al.

[11] Patent Number: 6,167,049
[45] Date of Patent: Dec. 26, 2000

[54] NON-ZERO MINIMUM CELL RATE FOR AVAILABLE BIT RATE ATM SERVICE

[75] Inventors: Tong-Bi Pei, Milpitas, Calif.; Kohei Abe, Yokohama, Japan; Robert E. Thomas, Fremont, Calif.

[73] Assignees: Cabletron Systems, Inc., Rochester, N.H.; Kabushiki Kaisya Toshiba, Kawasaki, Japan

[21] Appl. No.: 08/972,663

[22] Filed: Nov. 18, 1997

[51] Int. Cl.$^7$ .................................................. H04L 12/28
[52] U.S. Cl. ........................................... 370/395; 370/230
[58] Field of Search ................................... 370/395, 396, 370/391, 399, 397, 464, 468, 231, 232, 230

[56] References Cited

U.S. PATENT DOCUMENTS

| | | | |
|---|---|---|---|
| 5,392,280 | 2/1995 | Zheng | 370/60 |
| 5,463,620 | 10/1995 | Sriram | 370/468 |
| 5,515,363 | 5/1996 | Ben-Nun | 370/399 |
| 5,619,502 | 4/1997 | Kahn | 370/397 |
| 5,706,288 | 1/1998 | Radhakrishnan | 370/468 |
| 5,745,477 | 4/1998 | Zheng | 370/468 |
| 5,754,530 | 5/1998 | Awdeh | 370/232 |
| 5,793,747 | 9/1999 | Kline | 370/230 |
| 5,818,842 | 10/1998 | Burwell et al. | 370/397 |
| 5,864,538 | 1/1999 | Chong | 370/395 |
| 5,864,540 | 1/1999 | Bonomi | 370/235 |
| 5,953,336 | 9/1999 | Moore | 370/395 |

FOREIGN PATENT DOCUMENTS

| | | | |
|---|---|---|---|
| 0 471 379 | 2/1992 | European Pat. Off. | H04L 12/56 |
| 0 700 186 A1 | 3/1996 | European Pat. Off. | H04L 12/56 |
| 0 717 532 A1 | 6/1996 | European Pat. Off. | H04L 12/56 |

OTHER PUBLICATIONS

Hluchyj M.G., et al.: "Queueing Disciplines For Integrated Fast Packet Networks" Discovering A New World Of Communications, Chicago, Jun. 14–18, 1992, vol. 2, pp. 990–996, Institute of Electrical and Electronics Engineers.

Park K.; "Self–Organized Multi–Class QOS Provision For ABR Traffic In ATM Networks", Proceedings For The 1996 IEEE Fifteenth Annual International Phoenix Conference on Computers and Communications, Scottsdale, Mar. 27–29, 1996, No. Conf. 15, pp. 446–453, Institute of Electrical and Electronics Engineers.

*Primary Examiner*—Douglas W. Olms
*Assistant Examiner*—Ricardo M. Pizarro
*Attorney, Agent, or Firm*—Wolf, Greenfield & Sacks, P.C.

[57] ABSTRACT

A scheduler in accord with the invention schedules available bit rate (ABR) traffic over an asynchronous transfer mode (ATM) link in such a manner as to provide circuits having the ABR traffic service a minimum cell rate (MCR) that may be greater than zero. The scheduler uses static scheduling information to schedule traffic for high priority services, such as constant bit rate service. The static information also specifies transmit opportunities for an ABR circuit, in a manner analogous to that for CBR traffic. The statically scheduled transmit opportunities provide a negotiated minimum cell rate that is greater than zero, for the ABR circuit. The scheduler maintains dynamic scheduling information, which it uses to schedule traffic in otherwise available transmit times. For example, the scheduler may use the dynamic information to create a work list of virtual circuit connections for ABR service. During any cell transmit time that is not used by a higher priority service (e.g. CBR or MCR), the scheduler goes to the work list to find a circuit with a cell ready for transmission and initiates transmission of the cell for that circuit. The ABR circuit having a non-zero MCR receives service from the statically scheduled opportunities and from the dynamically scheduled opportunities.

36 Claims, 8 Drawing Sheets

| CELL TIME | VP INDEX | HIGH PRIORITY | MCR | LOW PRIORITY | ABR POINTERS | | NEXT SERVE TIME |
|---|---|---|---|---|---|---|---|
| a | VP1 | VC1 | | | H1 | T1 | b |
| e | VP1 | VC5 | 1 | | H5 | T5 | f |
| b | VP2 | | | VC3 | H2 | T2 | c |
| f | VP2 | | | VC1 | H6 | T6 | g |
| c | VP3 | | | VC2 | H3 | T3 | d |
| g | VP3 | VC2 | | | | | h |
| d | VP0 | | | VC1 | H4 | T4 | e |
| h | VP0 | VC2 | | | H8 | T8 | a |

POINTER → (row e)

FIG. 5

STATIC TABLE

| CELL TIME | VP INDEX | HIGH PRIORITY | MCR | LOW PRIORITY |
|---|---|---|---|---|
| a | VP1 | VC1 | | |
| b | VP2 | | | VC3 |
| c | VP3 | | | VC2 |
| d | VP0 | | | VC1 |
| e | VP1 | VC5 | 1 | |
| f | VP2 | | | VC1 |
| g | VP3 | VC2 | | |
| h | VP0 | VC2 | | |

POINTER → (row b)

FIG. 6

| CELL TIME | ABR POINTERS | |
|---|---|---|
| a | H1 | T1 |
| e | H5 | T5 |
| ⋮ | ⋮ | ⋮ |

ABR TABLE-VP1

*FIG. 7A*

| CELL TIME | ABR POINTERS | |
|---|---|---|
| b | H2 | T2 |
| f | H6 | T6 |
| ⋮ | ⋮ | ⋮ |

ABR TABLE-VP2

*FIG. 7B*

| CELL TIME | ABR POINTERS | |
|---|---|---|
| c | H3 | T3 |
| g | H7 | T7 |
| ⋮ | ⋮ | ⋮ |

ABR TABLE-VP3

*FIG. 7C*

| CELL TIME | ABR POINTERS | |
|---|---|---|
| d | H4 | T4 |
| h | H8 | T8 |
| ⋮ | ⋮ | ⋮ |

ABR TABLE-VP0

*FIG. 7D*

NON-ZERO MINIMUM CELL RATE FOR AVAILABLE BIT RATE ATM SERVICE

TECHNICAL FIELD

The present invention relates to techniques and devices for scheduling available bit rate (ABR) traffic over an asynchronous transfer mode (ATM) link, in such a manner as to provide a virtual circuit with ABR service having a specified minimum cell rate (MCR) that may be greater than zero.

BACKGROUND ART

Modern society is increasingly dependent on the ability to communicate information. More and more applications require communications of varying quantities of information between users. The trend in communications technology is to develop packet or cell based systems for communications transport and switching at ever higher speeds.

Increasing demands for many communication services, having different requirements, drove the development of separate networks. For example, analog voice telephone services utilize a complex network of voice traffic switches, lines and trunks to provide ubiquitous switched voice connectivity virtually throughout the world. The modern telephone network carries most voice traffic in digitized form, typically using time division multiplexing techniques. The switched voice network can carry some data traffic, using modems or ISDN interfaces. However, the telephone network cannot readily switch higher speed data traffic, therefore a variety of separate data networks evolved. Examples of such data networks include X.25, frame relay and SMDS. The construction, operation, maintenance and upgrading of such disparate networks for different services are increasingly complex and expensive, particularly as traffic demands continue to increase.

Asynchronous transfer mode (ATM) transport, an advanced, high-speed packet switching technology, has emerged as the latest form of packet or cell based switching. ATM promises fast cell switching for wide ranges of traffic demands. ATM is intended to carry virtually any type of information that can be expressed in or converted to digital form, from voice telephone traffic, to real-time video, to high-speed file transfers, to faster than real-time video, etc. ATM based networks are eliminating the need for different networks to carry different types of traffic. In ATM, transfer is asynchronous in the sense that the recurrence of cells that contain information from any particular sender is not necessarily periodic. Each device using the ATM network submits a cell for transfer when it has a cell to send. Once aggregated and scheduled, the ATM cells ride in synchronous slots on a high-speed media, such as a SONET optical fiber.

In ATM, information is organized into cells having a fixed length and format. Each cell includes a header, primarily for identifying cells relating to the same virtual connection, and an information field or "payload". The ATM standard defines a cell size of 53 bytes or octets. The first five bytes of each cell form the header, and the remaining 48 bytes represent payload data. The header of each cell includes a field for a virtual path identifier (VPI) and a virtual circuit identifier (VCI). The VPI and VCI together identify the particular circuit or communication to which each cell relates.

Within a transport stream, the VPI and VCI identifiers serve to divide the stream into separate logical or 'virtual' paths and to segregate traffic within each virtual path into logical or 'virtual' circuits. An ATM transport device makes the virtual circuit connections, within one or more virtual path connections, available to transport any number of individual communications over the link. Such logical circuit connections are set up and torn down, as needed, to efficiently provide required transport capacity for independent communication sessions to and from a number of separate communication devices.

Different types of communication require different transport rates. Also, different communications require different levels of service quality, sometimes referred to as quality of service or QoS. For example, real-time video transmission requires a high constant bit rate to maintain synchronism, whereas packet data communications do not. At the network speeds now available for ATM transport, voice communication becomes a bursty data traffic service. To provide these different levels of service, an ATM link typically will support a number of different types of traffic.

The specification for ATM transport defines five traffic or service categories supported by the ATM layer of the network, most notably including constant bit rate (CBR) service, variable bit rate (VBR) service and available bit rate service. CBR service provides a constant, guaranteed bandwidth over an assigned virtual circuit. VBR provides some maximum number of transmit opportunities, which may or may not be used to transmit cells over the associated virtual circuit, for example for bursty traffic. Over time, the actual rate or bandwidth may vary from almost zero (little or no use of the opportunities to send) up to the amount provided by the maximum number of transmit opportunities (full use) allocated for the circuit. With ABR service, a data communication device may have an opportunity to transmit in time slots that are available because the time slots were not used by CBR or VBR services.

For ABR service, the specification for ATM defines an allowed cell rate (ACR) and a minimum cell rate (MCR). The allowed cell rate is the bandwidth, in terms of cells per second, currently usable by a particular ABR connection. Typically, the ACR for an ABR connection varies over time, for example as a function of the traffic load on the ATM link. The minimum cell rate is the lowest bandwidth that the connection is always guaranteed.

The MCR may be zero, and if so, then the device regulating traffic need not reserve any bandwidth for the ABR connection. The scheduling device only needs to make a 'best effort' to provide bandwidth, unused by other connections, for use by the ABR connection. The device can, if necessary, allocate all transmit opportunities to higher priority traffic, in which case, the ACR for the ABR circuit falls to zero.

However, if the ABR connection has an MCR value greater than zero, then the scheduling device effectively must reserve some minimum number of cell transmit opportunities for that connection, to support traffic for that connection at no less than the MCR rate. The device can not allocate all transmit opportunities to other circuits and services. In existing ATM systems, there is no scheduling mechanism available, which can dynamically schedule traffic for ABR service and guarantee non-zero minimum cell rates for the ABR connections.

An ATM segmentation and reassembly circuit sold by Digital Equipment Corporation under the name AToM3 provided a VBR service within a minimum cell rate, but not an ABR service with a minimum cell rate. The AToM3 used a static scheduling table to support constant bit rate traffic and variable bit rate traffic. The lines of the static table, indexed by cell transmit time, contained fields for high priority service and low priority service. The scheduler in the AToM3 provided a guaranteed transmit opportunity for a virtual circuit connection identified in the high priority field, to provide CBR service for that circuit. In a cell transmit time, if the scheduler identified a VCC in the high priority field for a particular time slot, a cell was transmitted for that VCC in the time slot. The scheduler used the low priority fields for variable bit rate services. In any cell transmit time when there was no high priority cell transmission scheduled, the scheduler looked to the low priority field and offered the transmit opportunity to the VCC identified in that field. A cell was transmitted for the low priority VCC if that VCC had a cell ready for transmission.

The AToM3 supported the minimum bit rate guarantee for VBR service by using identifiers for the same VBR type VCC in the high priority field and the low priority field, in different lines of the static scheduling table. When the scheduler found the VCC in the high-priority field in one line of the table, the scheduler scheduled the cell transmission for that VCC during each cell transmit time that indexed that line of the static table, just as if the scheduler were providing a CBR service. Appearances of the VCC identifier in the low priority field of a number of lines provided additional bandwidth in the form of a variable bit rate portion of the service for the particular VCC.

In this manner, the AToM3 scheduler provided CBR service, VBR service and VBR service with a guaranteed minimum cell transmission rate. ABR type service requires dynamic scheduling. Although dynamic scheduling for ABR service is separately known, the static scheduling used in the AToM3, did not support ABR service and was not readily adaptable to ABR service. As discussed earlier, the known examples of dynamic scheduling for ABR services do not support an MCR value that is greater than zero. Consequently, a need still exists for a scheduling methodology and actual ATM transport devices that can deliver ABR service with a non-zero guaranteed minimum cell rate.

DISCLOSURE OF THE INVENTION

The present invention solves the above discussed problem by using a combination of static scheduling and dynamic scheduling of ATM cell transmit opportunities, to provide ABR transport with a minimum cell rate greater than zero. An ATM scheduler in accord with the invention statically schedules some non-zero cell transmit opportunities for the ABR virtual circuit, as if the circuit had a high priority service, similar to CBR service. This provides the guaranteed minimum cell rate. Other transmit opportunities are provided to the same virtual circuit, when transmit times are available because they were not used for other virtual circuits.

Thus, in one aspect, the present invention relates to a method of scheduling asynchronous transfer mode (ATM) cell traffic for transmission over a link, for available bit rate service. The method includes steps of statically scheduling and dynamic scheduling for one identified virtual circuit. The static scheduling relates to a first portion of traffic for the virtual circuit and provides cell transmission for that circuit in a first cell transmit time. This scheduled cell transmission provides a predetermined minimum cell rate greater than zero, for the identified virtual circuit. The dynamic scheduling relates to a second portion of traffic for the identified virtual circuit and provides an opportunity for transmission in a second cell transmit time not used for another circuit.

The present invention also encompasses ATM processing devices that incorporate elements for performing the scheduling operation, such as described above, to facilitate ABR service with a non-zero MCR.

For example, in one embodiment, the invention encompasses an ATM processing device, including an ATM cell transmitter for transmitting ATM cells over a link and a scheduler controlling transmission of cells by the ATM transmitter. A static scheduling table stored in memory is accessible to the scheduler. The static table includes a number of lines indexed by respective cell transmit times. Each line of the static scheduling table includes a field which may contain data identifying a virtual circuit connection assigned the opportunity to transmit in the respective cell transmit time. The scheduler controls the ATM transmitter to send a cell for each virtual circuit connection identified in a line of the static scheduling table, during the respective cell transmit time. In the preferred embodiment, this type of scheduling supports CBR service as well as transmissions for an ABR type circuit to provide the guaranteed MCR transmissions for that ABR circuit.

The first exemplary embodiment of the ATM processing device also includes a dynamic scheduling table. The scheduler maintains the dynamic table in memory. The dynamic scheduling table has a plurality of lines indexed by cell transmit times. For example in a device supporting traffic over multiple virtual paths, there is a separate dynamic table associated with each virtual path connection, and the scheduler indexes the lines of each dynamic table for each transmit time that is assigned to the associated virtual path. Each line of the dynamic scheduling table contains data, which the scheduler uses to identify at least one virtual circuit connection.

The scheduler also maintains a list in memory. The list identifies one or more virtual circuit connections selected from processing of the dynamic scheduling table. The scheduler accesses the list during an available cell transmit time in which there was no cell transmission scheduled as a result of processing of the static table. From its processing of the list, the scheduler identifies a virtual circuit connection with a cell to transmit, and the scheduler controls the ATM transmitter to transmit the ready cell during the available cell transmit time.

In accord with the invention, the field in at least one line of the static table identifies a predetermined virtual circuit connection. As a result, the processing of the static table will provide one or more transmit opportunities to the identified virtual circuit, in this case to support the non-zero MCR for that circuit. Also, the data contained in at least one line of the dynamic table is used for identifying the same virtual circuit connection. As a result, the processing of the dynamic table and the list will periodically offer transmit opportunities to that circuit as cell transmit times become available, supporting ABR type service for the circuit. In this manner, the predetermined circuit receives an ABR service with a minimum cell rate (MCR) that is greater than zero.

Another exemplary embodiment of the device utilizes a single table. Each line of this table includes static information, identifying a VPC and possibly identifying a VCC for one of the high priority services. Each line also includes fields for the dynamic scheduling information.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 5 is an example of a first implementation of a scheduling table useful in the present invention.

FIG. 6 illustrates a static scheduling table used by an ATM scheduler in accord with a second implementation of the invention.

FIGS. 7A to 7D depict simplified portions of dynamic scheduling tables used for scheduling ABR type ATM cell transmission in accord with the second implementation of the present invention.

BEST MODE FOR CARRYING OUT THE INVENTION

The present invention enables the scheduling of asynchronous transfer mode (ATM) cell traffic for transmission over a link. ATM transport devices operating in accord with the present invention incorporate a traffic scheduler, which preferably segregates traffic on the link into a plurality of virtual path connections. Within each virtual path, the scheduler preferably segregates traffic into a plurality of virtual circuit connections. The scheduler utilizes one or more tables to assign traffic of a variety of types into respective cell transmit time slots assigned to the virtual circuit connections. In accord with the invention, the scheduler provides static scheduling for some portion of the traffic for an ABR connection and performs dynamic scheduling, to make otherwise unused transmit times available for transmission of additional cells for the ABR connection.

The present invention thus utilizes a combination of static scheduling and dynamic scheduling to provide ABR type services. The scheduling requires information stored in memory, for use by the scheduler when scheduling and controlling actual cell transmission. The preferred embodiments maintain the scheduling information in one or more scheduling tables. As discussed more below, one embodiment utilizes a single table, containing static scheduling information and dynamic scheduling information. Another embodiment utilizes a static table, and one or more dynamic tables. Preferably, the scheduler supports traffic over multiple virtual paths. In the second embodiment, for example, there are separate dynamic tables for scheduling ABR traffic for each virtual path. Before detailed discussion of the structure and operation of the preferred embodiments, consider first a high level explanation of the scheduling process.

Figures 1A, 1B:
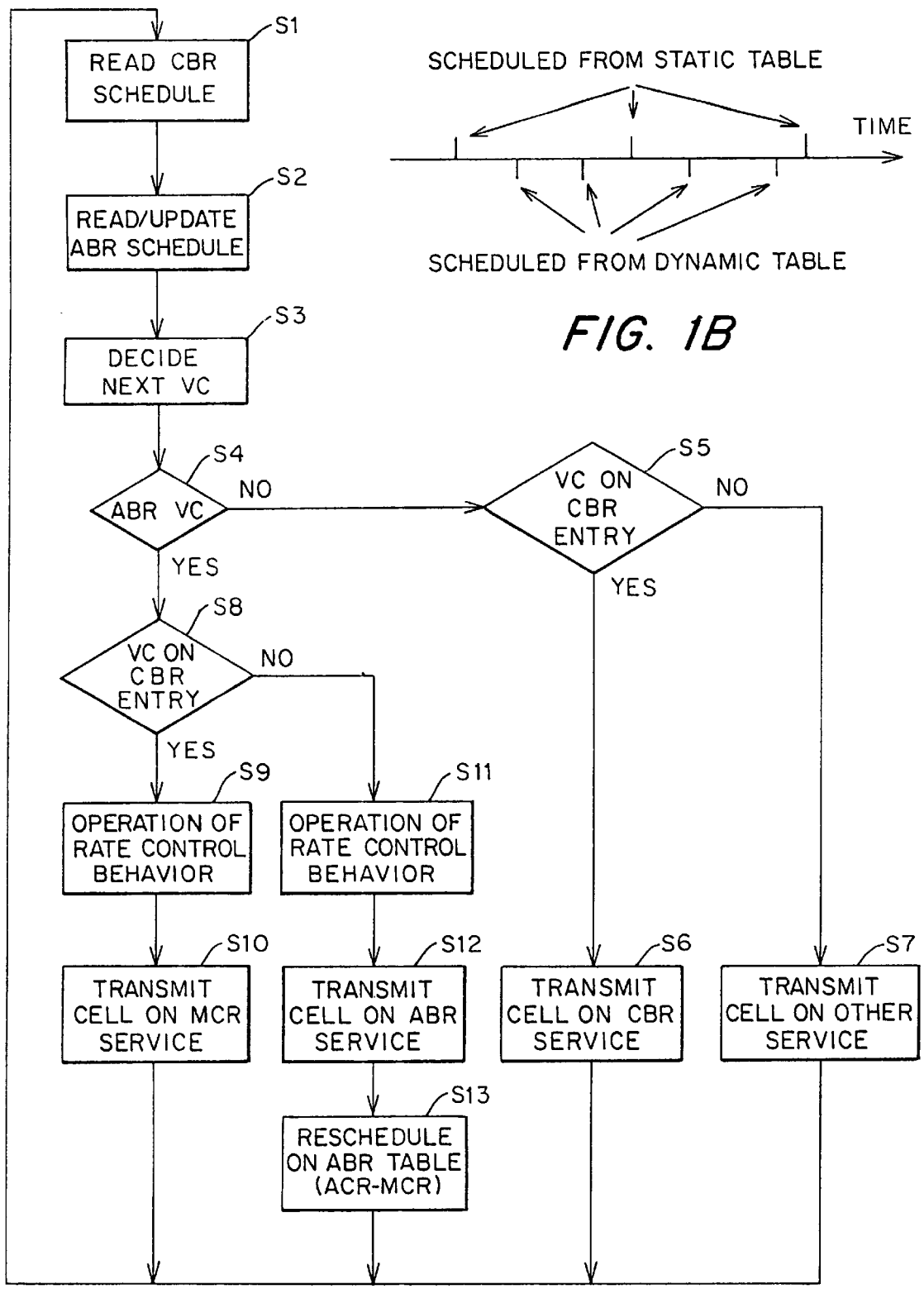
FIG. 1A is a high level flow diagram of the scheduling process for ATM cell transmission, in accord with the present invention.
FIG. 1B is a time line illustrating the transmit opportunities for the circuit having ABR service with a non-zero minimum cell rate.

FIG. 1A is a simplified flow chart illustration of the schedule processing of the present invention, for one cell transmit time. For simplicity of discussion with respect to the drawing, the static scheduling information is referred to as a CBR schedule. The first step of the process is for the scheduler to read its static CBR-type static scheduling information for the respective cell transmit time (S1). The scheduler also reads and updates dynamic scheduling information for ABR services, during the respective cell transmit time (S2). For example, the scheduler may access a link list of ABR virtual circuits and place identifiers for those circuits, if any, that have a cell awaiting transmission on a work list. Based on the scheduling information (S1 and S2), the scheduler will identify the next virtual circuit, i.e. the circuit that will carry a cell in the particular cell transmit time (S3). For example, if the static CBR scheduling information lists a virtual circuit connection (VCC) with CBR or MCR service, then the scheduler identifies that VCC for use of this cell transmit opportunity. If there is no cell scheduled for a higher priority service than ABR, then the scheduler goes to a work list to identify an ABR circuit with a cell that is ready and awaiting transmission. The scheduler then identifies that ABR VCC for use of this cell transmit opportunity.

The scheduler goes through one or more logic steps for branching of the process depending on the type of transmission scheduled. First, processing branches based on whether the identified next virtual circuit (VC) is an ABR circuit (S4). If not, then the process next branches based on whether the identified virtual circuit (VC) is a CBR circuit (S5). If the identified circuit is a CBR type circuit, then the scheduler initiates transmission of the cell for that service (S6). If the identified circuit is not a CBR type circuit, then the circuit relates to some other type of service (such as VBR), and the scheduler initiates transmission of the cell for that service (S7).

Returning to step S4, if the scheduler determines that the next VC identified for use of the present cell transmit opportunity is an ABR circuit, then the scheduling process branches to step S8. In that step, the process flow branches again based on whether or not this ABR circuit was identified for the transmit opportunity from the static CBR scheduling in step S1. If the scheduler identified the ABR type VCC from the static CBR schedule information, then the transmission is for providing a non-zero MCR for the ABR circuit. The scheduler therefore executes its flow control functions relating to the VCC (S9), for example including calculation of the current ACR value for the ABR service circuit. The scheduler then initiates the actual transmission of the cell (S10). This transmission step provides a minimum cell rate transmission.

In step S8, if the scheduler identified the VCC from the dynamic ABR processing information, then the scheduler executes its flow control functions relating to the VCC (S11) and initiates the actual transmission of the cell (S12). This transmission step provides a cell transmission because the transmit opportunity was 'available' for use by the particular ABR type VCC. Unlike the other process flow for ABR transmission for MCR service, the scheduler must also reschedule the ABR service for the circuit within the dynamic ABR processing information (S13). In an ABR service with a minimum cell rate of zero, the rescheduling would be proportional to the reciprocal of the allowable cell rate (ACR). However, for an ABR circuit having a non-zero minimum cell rate (MCR), the rescheduling is proportional to the reciprocal of the difference between the allowable cell rate (ACR) and the minimum cell rate (MCR). The rescheduling operation is discussed in more detail below, with regard to the preferred table embodiments of the dynamic ABR scheduling information.

FIG. 1B illustrates opportunities for cell transmission over one virtual circuit connection, where the circuit has ABR service with a minimum cell rate. In the illustrated example, the static table scheduling provides three transmit opportunities (above the time line) within some defined time period. Those opportunities are guaranteed and always used by the particular virtual circuit. The dynamic scheduling operations also provide transmit opportunities for the circuit (below the time line). The opportunities provided by the dynamic scheduling are only presented when transmit times are available for this circuit, and the circuit carries a transmit cell only if there is a cell ready for that circuit when each opportunity becomes available. In the simple example illustrated, the static scheduling provides three transmit opportunities for the virtual circuit within the defined time period, and the dynamic scheduling provides four more transmit opportunities for the circuit within that same period. The total opportunities within the time period correspond to the actual bandwidth used by the circuit.

The preferred embodiments of the present invention schedule ATM cell transmissions for CBR service, VBR service, ABR service with zero minimum cell rate and ABR service with non-zero minimum cell rate. The preferred embodiments support all of these services on a link carrying traffic through multiple virtual path connections (VPCs).

The preferred embodiments of the scheduler utilize static scheduling information and dynamic scheduling information. The static information identifies one VPC assigned or allocated each cell transmit time. The static information includes at least one field for identifiers of VCCs having high priority services, such as CBR or MCR service. The scheduler uses the dynamic scheduling information for ABR service. The scheduler indexes appropriate dynamic scheduling information for each cell transmit time in which the scheduler identifies the associated VPC in the static table. Using this information, the scheduler accesses a link list of VCCs, associated with the same VPC. In this case, the VCCs are circuits having ABR service. The scheduler adds the VCC identifiers from the link list to a work list associated with the currently indexed VPC. If there is no cell to transmit for a higher priority service, the scheduler goes through the work list for the indexed VPC, to identify a VCC having a cell to transmit and initiates transmission of that cell for the identified VCC.

The ATM traffic scheduling of the present invention may apply in a variety of ATM processing devices, such as ATM edge devices and other ATM routers and/or switches. The preferred implementation of the present invention applies the scheduling principles in a segmentation and reassembly circuit, typically used in an ATM user network interface (UNI). A high level functional description of a network and a UNI containing the scheduler is presented followed by a discussion of the preferred embodiments of the scheduling tables and processes implemented in the segmentation and reassembly circuit.

Figure 2:
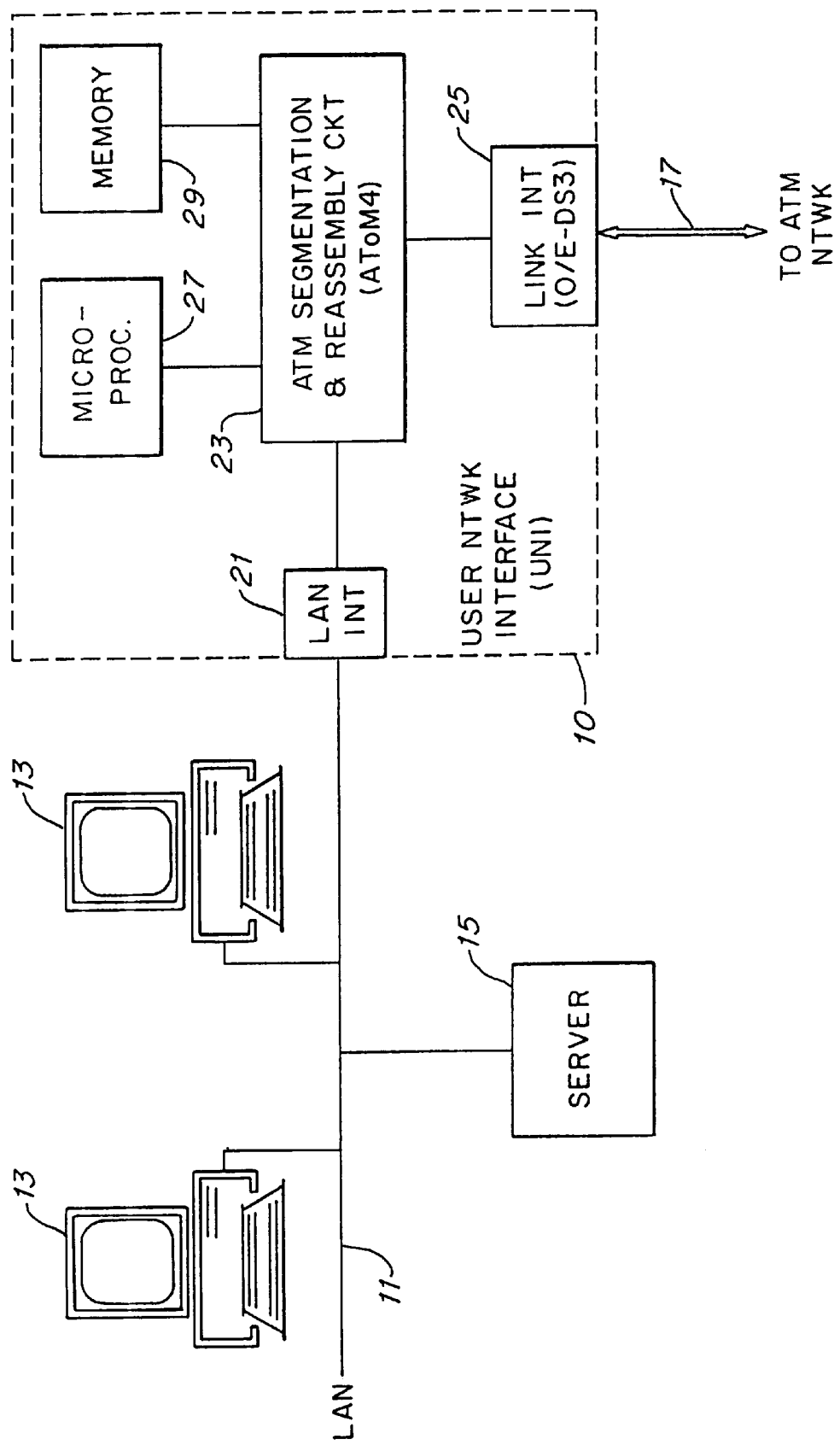
FIG. 2 is a block diagram of a data communication system including an ATM segmentation and reassembly circuit, performing ATM cell transmission in accord with the present invention.

FIG. 2 illustrates a user network interface (UNI) 10 providing a two-way data communication connection between a local area network (LAN) 11 and a high speed ATM link 17. The ATM link 17 typically connects to a switch or router of an ATM network (not shown). The LAN 11 provides packet data communications between various data devices connected thereto. In the simple example illustrated, the LAN 11 connects to a plurality of PCs 13 and to one or more servers 15. The UNI 10 and the connection thereof through the LAN 11 enables the PCs 13 and/or the server 15 to send and receive data communications over assigned virtual circuits on the ATM link 17. As discussed in more detail later, the segmentation and reassembly circuit 23 assigns virtual channel connections (VCCs) to data communication services from the PCs 13 and the server 15 and schedules transmissions depending on the types of service and bandwidths allocated to each of those data devices.

The ATM segmentation and reassembly circuit 23 controls the data flow between the cell based virtual circuits assigned on the ATM link and the packet based virtual circuits through the LAN 11 to the data devices 13, 15. The circuit 23 segments and adapts outgoing data for ATM transport and schedules transmission in assigned virtual paths and circuits. As part of this operation, the circuit 23 inserts VPIs and VCIs in the cell headers to logically place cells in the virtual paths and circuits. The circuit 23 also reassembles payload data from ATM cells into packets for transport to the data devices. The circuit 23 performs all necessary address administration in both directions.

Operations of the ATM segmentation and reassembly circuit 23 are controlled by a microprocessor 27. The microprocessor 27 serves as the node control processor for the UNI 10, for example to administer service negotiation between the UNI and the devices on the LAN 11 and between the UNI and the ATM node at the opposite end of the link 17. The ATM segmentation and reassembly circuit 23 also connects to a memory 29, such as a static random access memory (SRAM). The circuit 23 stores scheduling tables, link lists and work lists in the memory 29. Assembled outgoing cells containing segmented data and VPI/VCI values are buffered and queued in the memory. Also, payload data from incoming cells is accumulated in the memory 29 to form packets for transmission over the LAN 11 to the data devices.

The LAN 11 carries data communications in some standard type of packet data protocol, such as Ethernet. The packets include media access control layer addressing information, to facilitate two-way communication over the LAN. The UNI 10 includes a LAN interface 21 for physical connection to the LAN 11 and for conforming information going to and from the UNI 10 to the particular LAN protocol. The LAN interface 21 provides a two-way MAC level connection or interface to the ATM segmentation and reassembly circuit 23.

The link 17 carries ATM cells in some high speed transport format. For example, the link may be a DS3 communication channel on electrical cable or an OC-1 or OC-3 on optical fibers. The ATM segmentation and reassembly circuit 23 connects through its physical interface port to a link interface 25. The link interface 25 conforms the ATM cell information going to and from the UNI 10 to the signal type (electrical or optical) and the protocol (DS or SONET) of the link 17. The DS and OC protocols cited are examples only, and if other high speed protocol links are used, an appropriate interface 25 would couple the UNI to the particular link and perform the necessary interface of the UNI to the link.

One example of a chip capable of serving as the circuit 23 is the AToM4 manufactured by Digital Equipment Corporation and Toshiba. In the outgoing direction, the ATM segmentation and reassembly circuit 23 adapts information from LAN packets for ATM cell transport. The circuit 23 also maps packet address information into virtual path and circuit identifiers, in order to transmit cells for particular devices or services in assigned virtual circuits over the ATM link 17.

Figure 3:
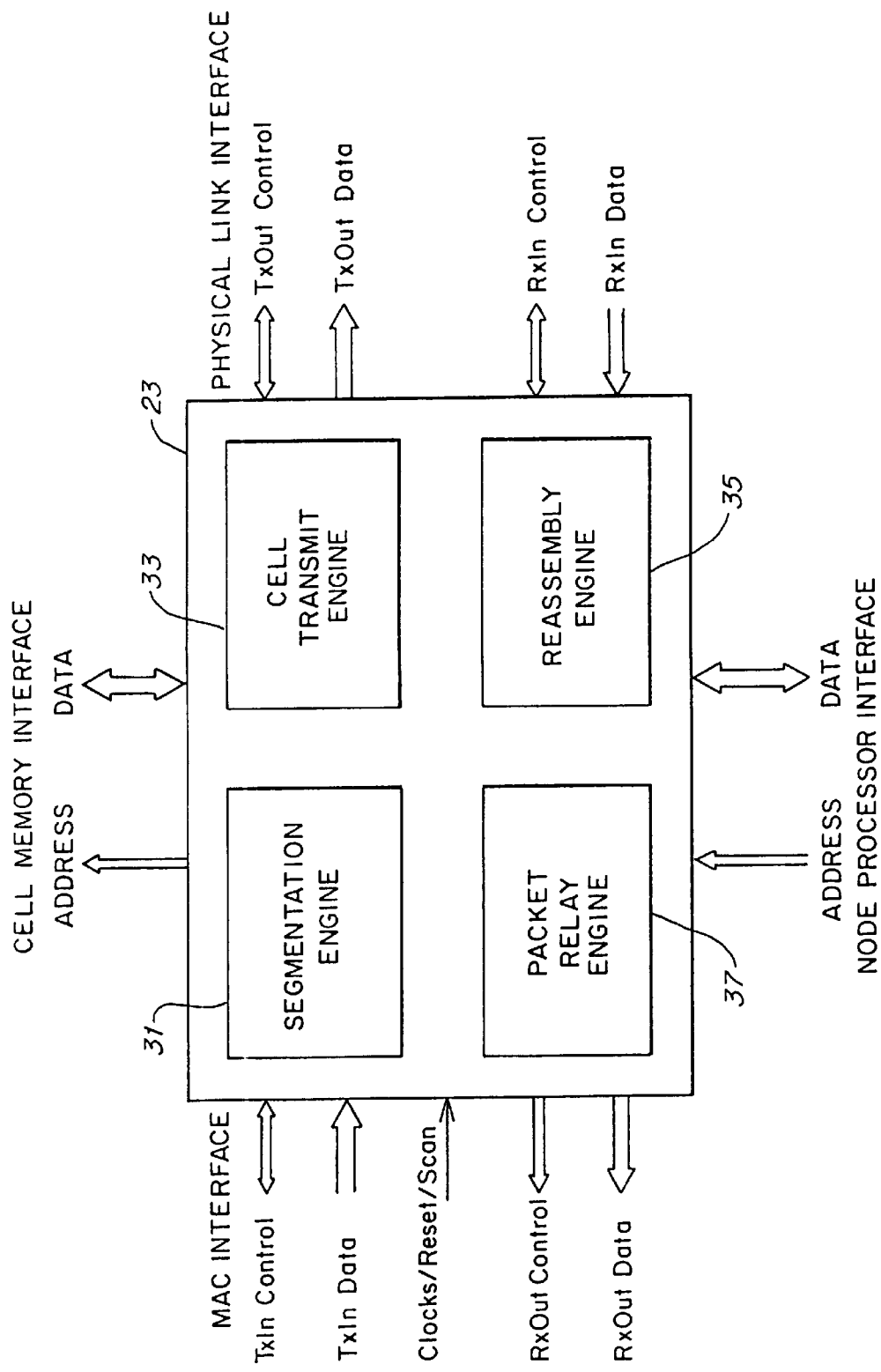
FIG. 3 is a high level block diagram of the ATM segmentation and reassembly circuit.

FIG. 3 is a high level functional block diagram of the ATM segmentation and reassembly circuit 23. The circuit 23 provides the functions required to implement a variety of high-performance ATM User Network Interfaces. This includes packet stream to circuit selection, ATM Adaptation Layer (AAL), segmentation and reassembly (SAR), and cyclic redundancy (CRC) generation and checking. The circuit 23 contains mechanisms to support traffic shaping, varieties of ATM flow control protocols, and Operations Administration and Maintenance (OAM) flows. The ATM segmentation and reassembly circuit 23 interfaces with a variety of physical layer chips by Utopia or specific interfaces 25, to facilitate media interface connection to DS3, E3, and HSSI links, etc.

The circuit 23 receives packets from the LAN interface 21 or the like for transmission on the ATM link 17 via a byte-wide data interface with one parity bit (TxInData) that runs at 12.5 MHz or 25 MHz. The control interface (TxInControl) includes packet delineation and byte flow control. The flow control signal is used to hold off transmission of data during periods where no buffers are available for the data to be transmitted. The receive portion of the packet interface is also byte wide for data with one parity bit (TxOut Data), and runs at the same speed as the transmit interface. There is a separate control channel (RxOut Control), which indicates receive packet delineation and error status.

The segmentation and reassembly circuit 23 connects to the actual link interface 25 through a physical link interface or port. The physical link interface consists of a byte-wide data path for both transmit (TxOut Data) and receive (RxIn Data). In all modes, the link interface is slaved from the link clock inputs. Speed matching FIFOs are used between clock boundaries. Byte transmission/reception to/from the link is controlled by either a gapped link clock or an overhead/valid indication signal on the control lines.

The cell memory interface consists of a 64-bit data bus (Cell Memory Data), with two additional parity bits and a 20-bit address bus (Cell Memory Address). Write enable and output enable signals are provided separately. An ATM segmentation and reassembly circuit memory word is 65 bits wide. The preferred embodiment of the ATM segmentation and reassembly circuit 23 is capable of addressing up to 1 Meg word (8 Mbytes) of memory. The external memory is used for storing ATM cells that are awaiting transmission or are being reassembled, records, traffic schedules and free buffer pools. The amount of memory required depends on the number of circuits being used in a particular application. Currently, 1 MB of memory is used to support 4096 circuits.

The segmentation and reassembly circuit 23 connects to the microprocessor 27 through a node processor interface or port. The node processor interface uses a 16-bit data and 7-bit address configuration. This port uses a synchronous Motorola 68K style interface, running at 12.5 or 25 MHz. All of the chip control and status registers (CSRs) can be accessed directly through this interface. The external memory 29 also is accessed indirectly through this interface.

Figure 4:
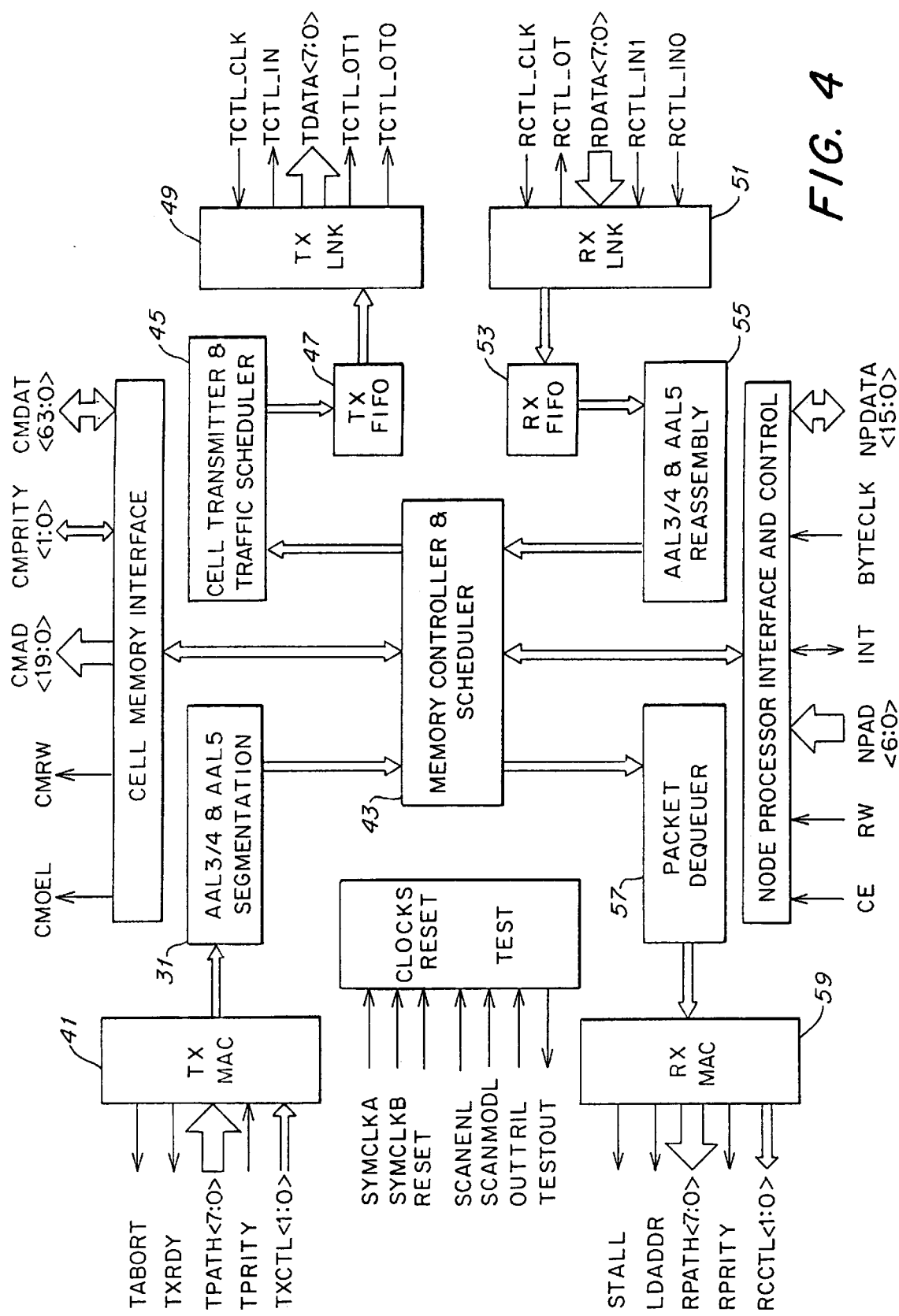
FIG. 4 is a more detailed block diagram of the ATM segmentation and reassembly circuit.

As shown in high level form in FIG. 3, the segmentation and reassembly circuit essentially comprises four processing engines, a segmentation engine 31, a cell transmit engine 33, a reassembly engine 35 and a packet relay engine 37. FIG. 4 shows the elements of the segmentation and reassembly circuit 23 in somewhat more detail.

As shown in FIG. 4, the segmentation engine 31 receives packets from a transmit MAC interface 41. The segmentation engine 31 segments packets into either AAL3/4 cells or AAL5 cells, according to the virtual circuit state that is set up for each packet. At the start of a packet, the segmentation engine 31 uses a region of the packet header to identify the particular ATM circuit that the cells should be queued on. Each ATM virtual circuit is identified with one of several virtual path connections (VPCs) and with a specific virtual circuit connection (VCC) within the particular VPC. Up to 4095 separate circuit queues are supported. The region of the header used is programmable and depends on the packet format, e.g., the format used on the LAN 11 in the example in FIG. 2.

The segmentation engine 31 supplies the cells to a memory controller and scheduler 43. The controller and scheduler 43 stores the cells resulting from the segmentation in external SRAM (memory 29) for transmission by the cell transmit engine 33. In the simplified embodiment illustrated (FIG. 4), the transmit engine 33 includes a cell transmitter and scheduler 45 and transmit FIFO buffers 47 which connect to the transmit link portion 49 of the physical link interface port. Transmission of a cell segmented from a packet can occur while the rest of the packet is still being segmented and hence transmit "cut through" is supported.

The cell transmit engine 33 services up to 4095 transmit queues for CBR, VBR, ABR and UBR traffic. CBR and VBR traffic is served according to a precomputed traffic schedule that is stored in external SRAM, using one or more schedule tables in accord with the invention. This schedule table(s) can be used for peak-rate traffic shaping on a per circuit basis. The manner in which this table is filled out can also allow prioritization of traffic and overbooking of bandwidth. The granularity of bandwidth assigned to circuits is programmable by appropriate programming of the table(s).

A speed-matching FIFO 47 is associated with the cell transmit engine 33 to account for the different clock speeds used for the core process (25 MHz) and the link process (0–25 MHz). The cells are simply output as a stream, e.g., for an STS-3c link. The byte stream output can be held off by either gapping the link clock or asserting the overhead indication signals.

The reassembly engine 35 receives cells through a receive portion 51 of the physical link interface. This engine 35 includes a FIFO 53 and a reassembly section 55. The reassembly engine 35 receives cells in byte-wide format from the link. The FIFO 53 provides speed matching between the link clock domain (0–19.44 MHz) and the core process clock domain (25 MHz).

Packet reassembly in section 55 begins by taking a cell from the FIFO 53 and looking up the receive circuit identification and state, which are stored in external SRAM (memory 29). The index to the receive circuit state table is based on individual lookups of the VPI field, the VCI field, and possibly the MID field if AAL4 is being used. If the circuit lookup indicates that the cell should be accepted, the cell is written to a free cell buffer in external memory 29. If a packet reassembly is completed by the addition of this cell data, the list of cells comprising the packet is moved to one of two packet lists, depending on priority bit setting for this circuit, and the circuit state is cleared. Otherwise, the circuit state is updated and written back to memory. Full AAL5 or AAL3/4checking is done, including CRC checking, length field checking, segment type checking, and sequence number checking.

The packet relay engine 37 comprises a packet dequeuer 57. The packet relay engine 37 services two prioritized queues each of which contains a list of cell buffers that represents reassembled packets. The reassembly engine 35 places reassembled packets into this queue and indicates to the packet relay engine 37 when a packet is ready for servicing. Each packet contains a pointer to the circuit that it was received on. The packet relay engine 37 provides the MAC destination address in the header of the reassembled packet. The packet header and the complete packet are passed to the MAC interface 37. The RxOut MAC interface 59 uses the MAC protocol to deliver packets. This protocol delineates the packets with start and end markers and it indicates the status of the packet, e.g., good or bad CRC. In the illustrated example, the receive MAC interface 59 (FIG. 4) supplies the reassembled packet to the LAN interface 21 for transmission over the LAN 11 to the destination device 13 or 15 (FIG. 2).

The above description of general transmit and receive operations of the ATM segmentation and reassembly circuit 23 is provided for understanding the context of the preferred implementation of the present invention. In accord with the invention, the scheduler associated with the cell transmitter 45 schedules a variety of different types of traffic on a hierarchical basis for a plurality of virtual paths within the ATM link. That scheduler implements a process similar to that of FIG. 1 using one or more scheduling tables. Further discussions will concentrate on hierarchical scheduling using two implementations of the scheduling table(s).

FIG. 5 depicts a simplified example of a first table embodiment, i.e. a single scheduling table, used in the scheduler. The scheduling table includes multiple lines indexed by cell transmit time. The first field in each line contains an identifier or index for one of the VPCs. This VP index corresponds to and may be the same as the virtual path identifier (VPI) inserted in the cell. The VP index in a line effectively assigns the cell transmit time of that line to the indexed virtual path connection (VPC).

The next two fields in each line identify VCCs for different levels of service priority, and the succeeding two fields point to lists of additional VCCs having a different type or level of service. The VC or VCC identifiers used in this table (and other tables discussed later) may take the form of internal numbers or names arbitrarily assigned as the identifiers. In such a case, the segmentation and reassembly circuit 23 will translate those identifiers into actual ATM standard virtual circuit identifiers (VCIs) for insertion into the cells transmitted over the ATM link by the interface chip. Alternatively, the segmentation and reassembly chip 23 may utilize ATM VCIs as the internal virtual circuit identifiers.

Returning to FIG. 5, after the VPC index, the next field in each line contains an identifier for a VCC having a high priority service. The high priority service may be a VBR service, but typically the high priority service is a CBR service. In accord with the invention, at least some of the VCCs identified in the high priority field are VCCs having ABR service. The identification of such an ABR circuit in the high priority field supports the MCR for those VCCs. As discussed more later, certain processing varies depending on whether or not a VCC identified in a high priority field receives an MCR transmission for an ABR service. To distinguish VCCs on this point, the high priority field has an associated MCR flag. If the flag is set, the VCC identified in the field is receiving an MCR transmit opportunity.

The next field in the table contains an identifier for a VCC having a low priority service. Here, low priority means that the service is lower in priority than the service (if any) identified in the high priority field. In preferred implementations, the high priority service is a CBR service or an MCR service, and the low priority service is VBR service. As discussed more below, other services, such as ABR traffic, actually have still lower priority than those identified in the 'low priority' field.

In operation, the scheduler moves a pointer to traverse the table as it increments the cell transmit time. The order of accessing the lines of the schedule table is a-b-c-d-e-f-g-h-a .... Different VPCs may use the same VCC identifiers, but each combination of a VPC identifier and a VCC identifier uniquely identifies one circuit. For each cell transmit time, the scheduler accesses one line in the table to perform a variety of scheduling functions, to identify a circuit for transmission in the cell transmit time. The scheduler first identifies a VPC from the currently indexed line. If the scheduler finds a VCC identifier in the high priority column, the scheduler initiates transmission of a cell over that VCC. For example, during cell transmit time a, the table identifies VP1 and VC1, therefore the scheduler initiates transmission of a cell for that circuit connection. The MCR flag is not set, indicating that the service is a CBR service instead of MCR service for an ABR type circuit. During cell transmit time e, the table identifies VP1 and VC5, therefore the scheduler initiates transmission of a cell for that circuit connection. The MCR flag is set, indicating that the service is an MCR service for the ABR type circuit VC5, therefore the scheduler performs the requisite flow control processing for that circuit.

The number of entries of the ABR type VCC in the high priority field defines the guaranteed bandwidth, that is the MCR, attributed to the particular ABR type circuit. This rate is static. The level of MCR for an ABR service is negotiated at call set up. In the example of FIG. 2, the data device 13 or 15 negotiates with the UNI 10 for a particular type of service, in this case, ABR service and for a minimum cell rate. In accord with the invention, the negotiated MCR may be greater than zero. Once negotiated, the MCR value does not change during communication, the MCR value remains constant in a manner analogous to that of a negotiated CBR rate. However, during communications the allowable cell rate ACR varies with the dynamic scheduling of ABR transmissions over the virtual circuit.

Returning to operations using the table of FIG. 5, if the scheduler finds no listing in the high priority column in a respective cell transmit time, the scheduler looks to the low-priority column. If the line identifies a VCC for low priority service, the scheduler checks the cell queue in memory 29 to determine if the queue holds a cell that is ready for transmission over that VCC. If so, then the scheduler initiates transmission of a cell for that VCC. If not, the scheduler offers the cell transmit opportunity to VCCs having lower priority services. In the examples discussed above, the scheduler initiated transmission for VC1 and VC5, for VP1, in time slots a and e, because those VCCs were listed in the high priority field. However, in cell transmit time b, the table identifies VP2, but there is no VCC listed in the high priority service column. The scheduler therefore looks to the low priority field in that line of the table. In this example, the low priority field for the transmit time b identifies VC3, therefore the scheduler checks the cell queue in memory 29. If the queue holds a cell for the VC3 circuit associated with VP2 that is ready for transmission, then the scheduler initiates transmission of that cell for that VCC. If not, the scheduler offers the cell transmit opportunity to VCCs having lower priority services associated with VP2.

For each cell transmit time, the scheduler also uses information from each line to schedule ABR services. In the single table implementation, each line specifies a pair of pointers for ABR service. The head and tail pointers (H, T) enable the scheduler to select a link list of VCCs associated with the VPC indexed in the particular line of the table. The link list includes VCC identifiers for associated circuits carrying available bit rate service type traffic. The scheduler accesses the identified link list stored in memory 29 and may append one or more of the VCCs from the link list to a work list. The scheduler may append all of the VCCs from the accessed link list to the work list. Alternatively, the scheduler may append VCC identifiers from the link list to the work list only for those circuits having a cell ready for transmission.

In the single table implementation, there could be one work list for all VPCs, but preferably the scheduler uses a separate work list for the ABR traffic for each VPC. Thus, the scheduler will append one or more VCCs from a particular link list to the work list associated with the indexed VPC. When the scheduler detects a cell transmit time for which there is no high priority service listed and there is no low priority circuit with a cell ready to transmit, the scheduler goes to the appropriate ABR work list. The scheduler goes through the list to select a source for a VCC for which there is a cell queued and ready to transmit.

Consider scheduling for several VCCs as simplified examples using the illustrated table. In the illustrated example, there are four VPCs (VP1 to VP0) each having one fourth of the link rate assigned as their respective bandwidth. To implement this allocation, each VPC has its identifier listed in one-fourth of the lines of the table. In the present example, the scheduler will run through similar processes for VP2, VP3 and VP0 for time slots b, c and d respectively. In the illustrated example, each VPC identifier appears in the line corresponding to every fourth cell transmit time.

In cell time a, for example, the scheduler accesses the first line in the table. Based on that line, the scheduler identifies VP1 as the VPC assigned this time slot. The scheduler checks the high priority field of the first line, identifies VC1 for high priority service. There is no MCR flag set for this transmit time, thus the scheduler treats the VCC as one having a CBR service. The scheduler causes transmission of a cell for the VP1 circuit VC1 in the present time slot. The cell transmitted includes VPI and VCI values corresponding to VP1 and VC1. During the processing for transmit time a, the scheduler also will use head and tail pointers H1, T1 from line a to access a link list and may move one or more VCCs from that list to an ABR work list associated with VP1, as discussed above. The scheduler goes through a similar process to initiate transmission of a cell for VP1-VC5 in time slot e, but the scheduler notes the MCR flag is set for that circuit connection. The scheduler initiates certain processing related to ABR service, in response to the MCR flag, as discussed in more detail later.

Although not shown, the scheduling table will include additional lines, and typically some of those lines will represent time slots for which there are no high priority circuits identified. For example, assume that for transmit time i, the table identified VP1, the high priority field is empty and the low priority filed identified VC2. After cell time h, the scheduler increments cell transmit time to time i and moves the pointer to that line of the table. Based on that line, the scheduler identifies VP1 as the VPC assigned this time slot. The scheduler checks the high priority field of the first line and finds no VCC identification. The scheduler next checks the low priority field. In this example, that field identifies VC2. Here, VC2 is a different VCC associated with VP1. The low priority service preferably is a variable bit rate service. The scheduler checks to determine if this VC2 has a cell ready for transmission. If VC2 has a cell ready to transmit, the scheduler causes transmission of that cell in the time slot i. The header of the transmitted cell contains a VPI corresponding to VP1 and a VCI corresponding to VC2. During the processing for transmit time i, the scheduler will also use head and tail pointers to access a link list and may move one or more VCCs from that list to an ABR work list associated with VP1, as in the earlier examples.

If the circuit VC2 for VP1 did not have a cell ready to transmit at time i, the scheduler goes to the work list for VP1 to find an ABR circuit with a cell to transmit. If there are circuits in the work list, the scheduler uses that list to select an ABR circuit with a cell ready. If the work list was empty before time i, the scheduler may look to the circuits on the link list accessed at that time to find a circuit with a cell to send. Assuming that the scheduler finds an ABR VCC with a cell that is ready to transmit, the scheduler causes transmission of a cell over that VCC in the time slot. For example, the scheduler may go down through the VP1 work list and identify VC5 for VC1 as the first circuit on the list with a cell ready for transmission. The scheduler controls the ATM transmitter to send the cell for that circuit over the link in the transmit time i. In this manner, VC5 for VP1 uses an ABR transmit opportunity. This opportunity is in addition to the MCR opportunity provided in the earlier example of transmission in time slot e based on identification of that same circuit in the high priority field of the table.

The scheduler indexes through the table as it repeatedly increments the cell time and moves the pointer. As it does so, the scheduler performs similar functions to identify virtual circuits within the other VPCs for transmission scheduling. As another example, when cell transmit time c occurs, the scheduler accesses the corresponding line in the table. Based on that line, the scheduler identifies VP3 as the VPC assigned this time slot. The scheduler checks the high priority field of the first line. In this example, there is no CBR or MCR service VCC listed.

The scheduler next checks the low priority field. In this example, that field identifies VC2 associated with VP3. The low priority service preferably is a variable bit rate service. The scheduler checks to determine if this VC2 has a cell ready for transmission. If VC2 has a cell ready to transmit, the scheduler causes transmission of that cell in the time slot c. The header of the transmitted cell contains a VPI corresponding to VP3 and a VCI corresponding to VC2. During the processing for transmit time c, the scheduler will also use head and tail pointers H3, T3 to access a link list and move VCCs from that list to an ABR work list associated with VP3.

Assume now that in time c circuit VC2 for VP3 did not have a cell to transmit. In such a case, the scheduler goes to the work list for VP3 and/or to the link list accessed in that time slot, to find an ABR circuit with a cell to transmit. Assuming that the scheduler finds a VCC with a cell that is ready to transmit, typically from that work list, the scheduler causes transmission of a cell over that VCC in the time slot c. If the VCC with ABR service has an MCR greater than zero, it will have its identifier listed in the high priority field of another line (not shown) identified with VP3, in a manner similar to that for VC5 associated with VP1.

The scheduler indexes the table at the cell rate of the link. The scheduler executes the hierarchical scheduling process for each line of the table. When the scheduler completes processing for the last line, it increments the cell transmit time in such a manner as to cycle back to time a and index the first line of the table. In this fashion, the scheduler repeatedly cycles through the table to present transmit opportunities for specific circuits identified in the table and in the ABR work lists.

The listing of the VCCs in the high and low priority columns of the tables allocate transmit opportunities and bandwidth to those services. Constant bit rate service is provided by entries in the high priority fields of the table, and the number of entries in those fields determines the bandwidth within the VPC allocated to the particular VCC for its CBR service. In the above example, VC1 for VP1 appeared only in the high priority column. The circuit VP1-VC1 receives CBR service because the table guarantees that circuit an opportunity to transmit each time that cell transmit time a occurs. The circuit VP1-VC1 will always transmit a cell in that time slot, even if the cell contains no data, to maintain a constant bit rate flow. Similarly, MCR service for ABR circuits is provided by entries in the high priority fields of the table, and the number of entries in those fields determines the bandwidth within the VPC allocated to the particular VCC for its MCR service. The circuit VP1-VC5 receives MCR service because the table guarantees that circuit an opportunity to transmit each time that cell transmit time e occurs. The circuit VP1-VC5 will always transmit a cell in that time slot, even if the cell contains no data, to maintain a constant bit rate flow.

Similarly VC2 for VP3 appeared in the low priority column in a line which included no higher priority entry. That entry guarantees VC2 an opportunity to transmit each time that cell transmit time c occurs. If the VCC circuit uses the opportunity every time, it receives its maximum allowable cell transmission rate. However, at times this VCC may not have a cell that is ready to transmit. If the VCC does not transmit in that slot, its transmission rate decreases, and the transmit opportunity passes to the still lower priority ABR service VCCs associated with VP3.

The table structure also supports a combination of CBR and VBR services for a given circuit, effectively to provide such a circuit with a variable rate service having a guaranteed minimum transmission rate. If a circuit, such as VC2 for VP3, has one or more entries in the high priority column, those entries guarantee a minimum cell rate, essentially as a CBR service (see the line for time slot g). The appearance of the same VCC in the low priority field (e.g. in the line for cell time c) provides an added variable rate opportunity that the circuit need not always use.

As shown in FIG. 5, the first embodiment of the schedule table also includes a column specifying next serve time, for ABR services. The 'next serve time' ΔD is used to reschedule ABR service for a link list. For this purpose, the scheduler takes the link list pointers from the previous point in the table and moves them down the table by the amount identified in the 'next service time' field, and inserts the head and tail pointers into a table line associated with the same VPC. The scheduler dynamically calculates these next service times, for example, based on transmissions during the MCR processing of the static information and ABR transmissions during processing of the dynamic scheduling information.

This form of rescheduling for ABR service is complex. The table must specify next serve time. Each ABR link list may have a different rescheduling interval ΔD, and in fact, the interval may change over time depending on traffic. The calculation for an ABR service with a non-zero MCR is different from that for an ABR service with an MCR of zero. Also, any change in bandwidth allocations requires redoing all of the table entries, for CBR, VBR and ABR services.

To provide a more flexible scheduling for ABR service and easier rescheduling, the second embodiment of the scheduling process uses separate tables for ABR traffic. Specifically, one static table indexes VPCs and identifies high and low priority VCCs for CBR, MCR and VBR traffic. There is a separate, dynamic ABR table associated with each respective VPC. When the scheduler accesses a line of the static table for a given cell transmit time, it first identifies a VPC assigned that slot for its use. The scheduler processes CBR, MCR and VBR traffic using VCC identifiers from the indexed line of the static table, in essentially the same manner as for the single table of FIG. 5. The scheduler accesses a dynamic ABR table for the indexed VPC to retrieve a link list and append that list to a work list associated with the VPC. Moving the pointers for that list down the respective ABR table reschedules service for a specific link list of VCCs by an appropriate number of lines. It should be noted, that with the second implementation, a reallocation of bandwidth between VPCs requires modification of the number of lines each VPC has in the static table. However, the ABR tables require no modification.

Figure 8:
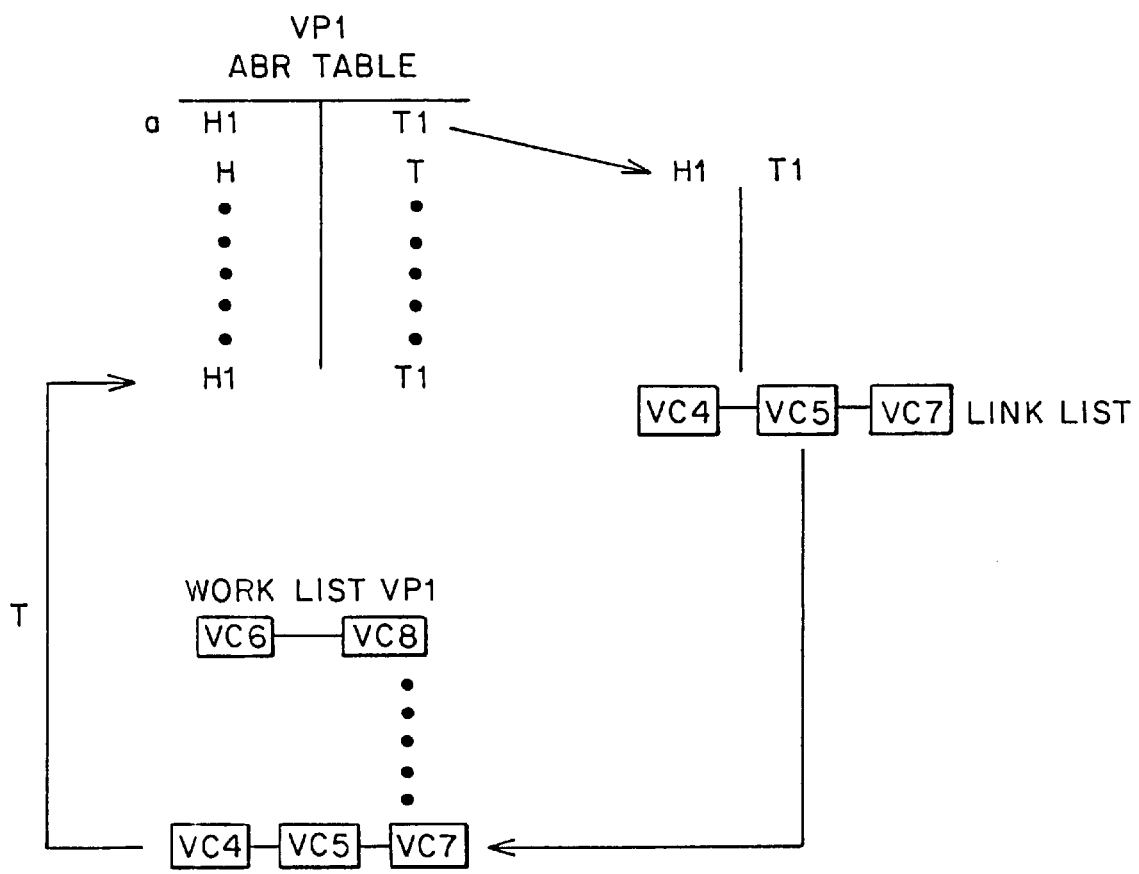
FIG. 8 is a process diagram useful in understanding work list operations for ABR service.

FIG. 6 illustrates one example of a static scheduling table; and FIGS. 7A to 7D illustrate simplified portions of the dynamic scheduling tables, in accord with this second embodiment. FIG. 8 illustrates process flow for an ABR work list, in the second embodiment.

As shown in FIG. 6, the static scheduling table includes multiple lines indexed by cell transmit time. The scheduler moves a pointer to traverse the static table at the cell slot time rate of the ATM link, i.e. the pointer for this table moves to the next line each time that the scheduler increments the cell transmit time. Each line of the table corresponds to one cell transmit time slot. When the scheduler increments the cell transmit time after the processing of the last line of the table, the scheduler moves the pointer to the first line of the static table.

The first field in each line contains an identifier or index for one of the VPCs. The VPC index in a line effectively assigns the cell transmit time of that line to the indexed VPC. In the illustrated example, again there are four virtual path connections (VPCs), and the static table includes virtual paths indexes VP1, VP2, VP3 and VP0 for those virtual paths. Each row in the table represents an opportunity for transmission of a cell for the indexed VPC. In the example, each VPC receives a transmit opportunity every fourth time slot. Thus each VPC may use up to 25% of the link bandwidth.

The next field in each line of the static table is provided for an identifier for a VCC having a high priority service. Some lines include identifiers in this field, some do not. The high priority service may be a VBR service, but again preferably relates to either a CBR service or the MCR portion of service for an ABR circuit. The status of an MCR flag (0 or 1) indicates whether or not the VCC in the high priority field is transmitting for the MCR of an ABR service. The next field in the table is provided for an identifier for a VCC having a low priority service. Some lines include an entry in the low priority field, some do not. The term 'low priority' only means that the service is lower in priority than the service (if any) identified in the high priority field. Again, other services, such as ABR traffic, actually have lower priority than those identified in the 'low priority' field. The scheduler processes the high and low priority entries in essentially the same manner as in the earlier embodiment.

The scheduler first presents the send opportunity to the VCC (if any) identified in the high priority field. High priority entries in the static table typically are used for CBR services and for a constant bit rate type service to provide a non-zero MCR for an ABR circuit. Each cell time that the scheduler hits a VCC for a CBR service in the high priority field of a line, the scheduler schedules cell transmission for that VCC. Each cell time that the scheduler hits a VCC for an MCR service in the high priority field of a line, the scheduler schedules cell transmission for that VCC, notes the MCR flag and executes the appropriate flow control algorithm for the particular ABR circuit. If there is no data to send, the VCC having the CBR service or the MCR service still transmits a cell, albeit a cell having the VPI and VCI values assigned to the circuit in the header but having no data in the payload. If the high priority field were used for some service other than CBR or MCR, e.g. VBR, then the scheduler would determine if there is a cell buffered in the memory awaiting transmission over the high priority VCC.

The high priority processing often does not cause scheduling of transmission in the respective cell time slot. Typically, this occurs because there is no VCC listed in the high priority field (for CBR or MCR), or possibly because a VCC in that field has VBR service but no cell is ready for transmission on that circuit. In any such case, the scheduler passes the cell transmit opportunity to the VCC (if any) identified in the low priority field. The low priority entries typically are used for variable bit rate services. This service provides transmit opportunities that the circuit may not always use, typically to support busty data traffic. Each cell time that the scheduler hits a VCC for a VBR service in the low priority field of a line, the scheduler offers the cell transmit opportunity to that specific VCC. If the scheduler determines that the identified VCC has a cell buffered in memory and ready to send at the present cell transmit time, then the scheduler will initiate transmission of the cell for that VCC. If not, then the scheduler looks to circuits having still lower priority service, such as available bit rate service, to identify a circuit and a cell to transmit.

As in the earlier embodiment, by placing identifiers for the same VCC in the high priority field and the low priority field, in different lines of the table, the scheduler actually provides a variable bit rate service with a guaranteed minimum bandwidth. If the scheduler finds the VCC in the high-priority field in one line of the table, the scheduler schedules the cell transmission for that VCC during each cell transmit time that indexes that line of the static table, just as if this were a CBR service. The number of lines in the table, which include the VCC identifier in the high priority field, establishes the CBR-like minimum bandwidth. Appearances of the VCC identifier in the low priority field of a number of lines provides additional bandwidth in the form of a variable bit rate portion of the service for the particular VCC. The MCR flag would not be set, because this combination of CBR and VBR requires no dynamic flow control.

The preferred implementation of the scheduler uses dynamic scheduling tables for ABR service. There is a dynamic table for each of the VPCs. The scheduler indexes a line of the appropriate dynamic table for each cell transmit time in which the scheduler identifies the associated VPC in the static table. The scheduler reads one or more pointers from the line of the dynamic table and uses the pointer(s) to access a link list of VCCs, associated with the same VPC, having ABR service. The scheduler may add one or more of the VCC identifiers from the link list to a work list associated with the currently indexed VPC. In one implementation, the scheduler goes through the link list and determines which listed circuits have cells awaiting transmissions. The scheduler places the VCC identifiers for such circuits, if any, on the work list. If there is no cell to transmit for a higher priority service, the scheduler initiates transmission for the first circuit listed on the work list. Alternatively, when the scheduler accesses the link list, it may place all of the VCC identifiers on the work list. In this later implementation, if there is no cell to transmit for a higher priority service, the scheduler goes through the work list to identify the first VCC having a cell to transmit and initiates transmission of that cell for the identified VCC.

The scheduler traverses each dynamic ABR table at the cell rate for the associated VPC. That is to say that the scheduler reads the next line of the ABR table, for a particular VPC, each time that the scheduler reads the index for that VPC from a line of the static table. As such, the speed of the movement of the pointer associated with each ABR is scaled as a function of the percentage of bandwidth or cell rate allocated to the respective VPC.

The scheduler maintains a separate dynamic table for ABR services for each VPC that the scheduler supports. How often the VCC for an ABR service appears in the ABR table together with the number of appearances (if any) of the VCC in the high priority field of the static table determines the maximum bandwidth available to the particular VCC circuit. As noted, a cell is transmitted for such a VCC in each cell transmit time corresponding to a line of the static table that identifies the VCC in the high priority field. Those transmit opportunities are guaranteed and always used. However, during ABR processing, the VCC can only transmit when a cell time slot is available for ABR transmission and the particular VCC is the first VCC identified on the work list with a cell ready for transmission.

The ABR table is a dynamic table. Each time that a VCC is presented an opportunity to transmit, the associated link list is removed from the work list, and the scheduler moves the head and tail pointers for that link list down the ABR table to a new location. The distance down the table to the new location determines the time delay until the next retrieval and placement of the link list on the work list and thus the next opportunity for that ABR VCC to send a cell. The rescheduling distance is inversely proportional to the difference between the current ACR for the circuit and the MCR (if any) for the circuit.

In the example under discussion, there are four VPCs; therefore the scheduler maintains four dynamic ABR tables, portions of which appear in FIGS. 7A to 7D. Each ABR table includes a cell time index for each line of the table. However, here the cell times are only those assigned to the associated VPC in the static table. Assume for this discussion that the scheduler accesses an ABR table for every cell transmit time. For example, in FIG. 6, the static table shows assignment of times a and e to VPI. The dynamic ABR table for VP1 (FIG. 7A) therefore shows lines for times a and e. Similarly, the static table shows assignment of times b and f to VP2 and the corresponding ABR table for VP2 (FIG. 7B) shows lines for times b and f. The tables show similar assignments for VP3 and VP0.

Over time, the scheduler indexes down through each dynamic table for each respective time slot corresponding to the same VPC as the particular dynamic table. The scheduler also dynamically updates each of these tables. If the scheduler reaches the current end of such a table, it recycles to the current top line of the table and continues on.

Each line of an ABR table includes head and tail pointers H, T. The pointers identify a link list of VCCs associated with the particular VPC. FIG. 8 shows the flow of the link list and work list processing. In the illustrated example, at time a, the scheduler reads H1, T1 from the ABR table for VP1. The scheduler uses those pointers to retrieve a work list, in the example containing identifiers for VC4, VC5 and VC7 associated with VP1. The scheduler could check the status of the circuits on the link list, and append VCC identifiers to the work list only for those circuits having a cell ready to send. In the illustrated example, the scheduler appends all of the VCC identifiers from the link list to the work list. In the example illustrated, VC6 and VC8 are presently at the top of the work list for VP1. The scheduler appends the new link list to the bottom of that work list.

When a transmit opportunity for VPI arises, if there is no higher priority service ready to transmit (cell transmit time i in one earlier example), the scheduler goes to the work list for VP1. In the illustrated example, the scheduler goes down through the work list to identify the first VCC on the list that has a cell ready to send. For this purpose, the scheduler goes down through the work list, starting with VC6 and checks the cell queue with respect to each VCC. Assume for this example that the first VCC with a cell queued and ready to send is VC5. The scheduler initiates transmission of the cell for that circuit and reschedules service for the link list containing VC5. In the example, the scheduler removes the list of VC4, VC5 and VC7 from the work list and places the pointers H1, T1 for that list back in the ABR table for VP1.

The precise placement in the dynamic table depends on the applicable rescheduling algorithm. More specifically, in this second embodiment, moving the pointers for an ABR link list down the ABR table by some distance $\Delta D$ reschedules service for the VCCs on that link list. As noted earlier, the scheduler traverses the ABR table for a particular VPC at a fraction of the cell rate corresponding to the fraction of the link rate allocated to that VPC. The rescheduling therefore also must be scaled to the appropriate percentage of bandwidth or link rate allocated to the VPC. Also, the distance differs depending on whether or not the ABR circuit has an MCR greater than zero. In the preferred process, the distance $\Delta D$ for a circuit with a zero MCR equals the percentage bandwidth for the associated VPC multiplied by the reschedule time ($\Delta T$) for this ABR VCC. The reschedule time ($\Delta T$) equals the link rate divided by the allowed cell rate (ACR) for the ABR service to the particular VCC. The ACR value varies dynamically depending on traffic.

For circuits having a non-zero MCR, the distance for rescheduling for an ABR VCC in the dynamic table equals the bandwidth of the VPC multiplied by the total link rate, and divided by the difference between the ACR and the MCR for the VCC. Stated another way, if the distance is $\Delta D$, the distance is approximated by the following equation:

$$\Delta D = \frac{(VPCBW) \text{link rate}}{ACR - MCR}$$

where VPCBW is the bandwidth assigned to the entire VPC, ACR is the allowable cell rate currently calculated for the particular VCC, and MCR is the minimum cell rate for the VCC. The distance $\Delta D$ is not exact but provides an adequate approximation for rescheduling if the total MCR bandwidth is relatively small.

In the above discussed processing, the scheduler accessed the appropriate ABR table during the schedule process for each cell transmit time, regardless of the type of transmission scheduled in each time slot. In a preferred embodiment, the scheduler skips access to the ABR table if the static table identifies an ABR circuit for an MCR transmission. Returning to the example illustrated in FIG. 6, assume that the circuit VC5 associated with VP1 is an ABR circuit having a listing in the high priority column of the static table in the line for time slot e. As discussed above, this listing supports MCR transmissions for that circuit, in each occurrence of time slot e. During other time slots associated with VP1, e.g. time slot a in the simple example shown, the scheduler will access the ABR table for VP1. However, the scheduler will detect the MCR flag set in the line for time slot e, and the scheduler will not access an ABR table during processing for that cell transmit time. As a result, the ABR table for VP1 would have listings only for those time slots associated with VP1 in which the scheduler will access that table, only for occurrences of time slot a, in the simple example shown in the drawings.

With this preferred processing for ABR circuits with MCR, a more exact rescheduling formula should be used. Specifically, for circuits having a non-zero MCR, the distance for rescheduling for an ABR VCC in the dynamic table equals the bandwidth of the VPC minus the total MCR bandwidth for circuits within the VPC multiplied by the total link rate, and divided by the difference between the ACR and the MCR for the VCC. Stated another way, if the distance is $\Delta D$, the distance is calculated by the following equation:

$$\Delta D = \frac{(VPCBW - MCRBW) \text{link rate}}{ACR - MCR}$$

where VPCBW is the bandwidth assigned to the entire VPC, MCRBW is the total minimum cell rate bandwidth for the particular VPC, ACR is the allowable cell rate currently calculated for the particular VCC, and MCR is the minimum cell rate for the VCC.

In an actual implementation, the scheduler stores two copies of the scheduling table (FIG. 5) or two copies of the static table (FIG. 6). One copy of the table is active, and the other is not. To reprogram the service hierarchy, the microprocessor modifies the inactive copy of the table and transfers and changes the active/inactive status of the two tables. In the second embodiment, FIGS. 6 and 7, the dynamic tables need not be changed each time the microprocessor modifies the static table. The microprocessor modifies the dynamic tables on-the-fly, as part of its rescheduling process, to add and delete ABR circuits. It may be helpful to consider some examples.

In the second implementation, tear-down or set-up of a real-time connection requires modification of the static schedule table. One control bit in a control and status register indicates which of the two static tables currently is in use. The microprocessor negotiates service with the appropriate data device 13 or 15 to define the circuit to be set up or torn down, and modifies the inactive static table to reflect this change. After completion of modification of this table, the microprocessor flips the control bit to activate usage of the new static table and to deactivate the other table. When the current time pointer reaches the end of the old table and wraps around to the cell time for the top of the table, the base of the new static table is copied to the current time pointer, and the scheduler begins using the new static table. The microprocessor uses this process, for example, for CBR circuits and for the MCR service to ABR circuits.

To set up or tear down a non-real time connection, the microprocessor initiates a treatment of the circuit by modifying the rescheduling process in the appropriate dynamic, ABR table. For example, to set up such a connection, the UNI 10 negotiates the level of service (type and bandwidth) for a new logical connection. The UNI 10 stores data mapping the address information for the portion of the circuit on the LAN to the assigned ATM identifiers. The microprocessor modifies a status register associated with the circuit. When the circuit first has traffic to send, the pointers for the link list containing the circuit are added to the dynamic table for the appropriate VPC. To tear down a connection, the status register for the circuit is changed to inactive. After the next service opportunity is offered to the circuit, the scheduler will not reschedule service for that circuit in the ABR table. If the ABR service has an MCR greater than zero, the microprocessor also modifies the static table in the manner outlined above.

As discussed above, the number of appearances of a VPC identifier in the VP index of the static table determines the bandwidth allocation to the VPC. To modify the bandwidth for a VP, the microprocessor changes the inactive copy of the static table to include the VPC in the appropriate number of lines for the new level of bandwidth and then activates the modified copy of the table in the manner outlined above.

If the scheduler completes the static table, dynamic table and work list processing without finding a circuit with a cell to send, the scheduler could initiate transmission of a null cell, but preferably the transmit opportunity passes down to one or more lower level service circuits. In the preferred implementation, the segmentation and reassembly circuit supports a number of other types of flow control, such as quantum flow control. For simplicity of discussion, assume that there is one lower level service, quantum flow control. Quantum flow control (QFC) processing maintains a 'credit' for each VCC subscribing to the service. For each VPC, the scheduler maintains a separate queue of VCCs for QFC based services. The scheduler identifies the VPC from the VP index in the static table and performs its processing for CBR, MCR, VBR and ABR, as discussed earlier. If the VPC assigned to a particular cell time has no cell ready to send for any VCC having those services, the scheduler looks to a queue of VCCs for QFC, associated with the currently identified VP, to find a QFC VCC that may have a cell to send.

When a QFC opportunity to transmit arises with respect to one VPC, the scheduler checks if the next VCC on the queue for that VPC has any transmit credit remaining. If so, the scheduler initiates transmission of a cell for that VCC. If the VCC has no credit remaining, then the scheduler looks to the next VCC in the QFC queue to see if that VCC has any transmit credit available. The scheduler continues down through the QFC queue in this manner until it finds a VCC with a cell that is ready to transmit or until in reaches the end of the QFC queue. If the QFC processing identifies a VCC with a credit and a cell that is ready to send, the scheduler initiates transmission of the cell for that VCC.

Figure 9:
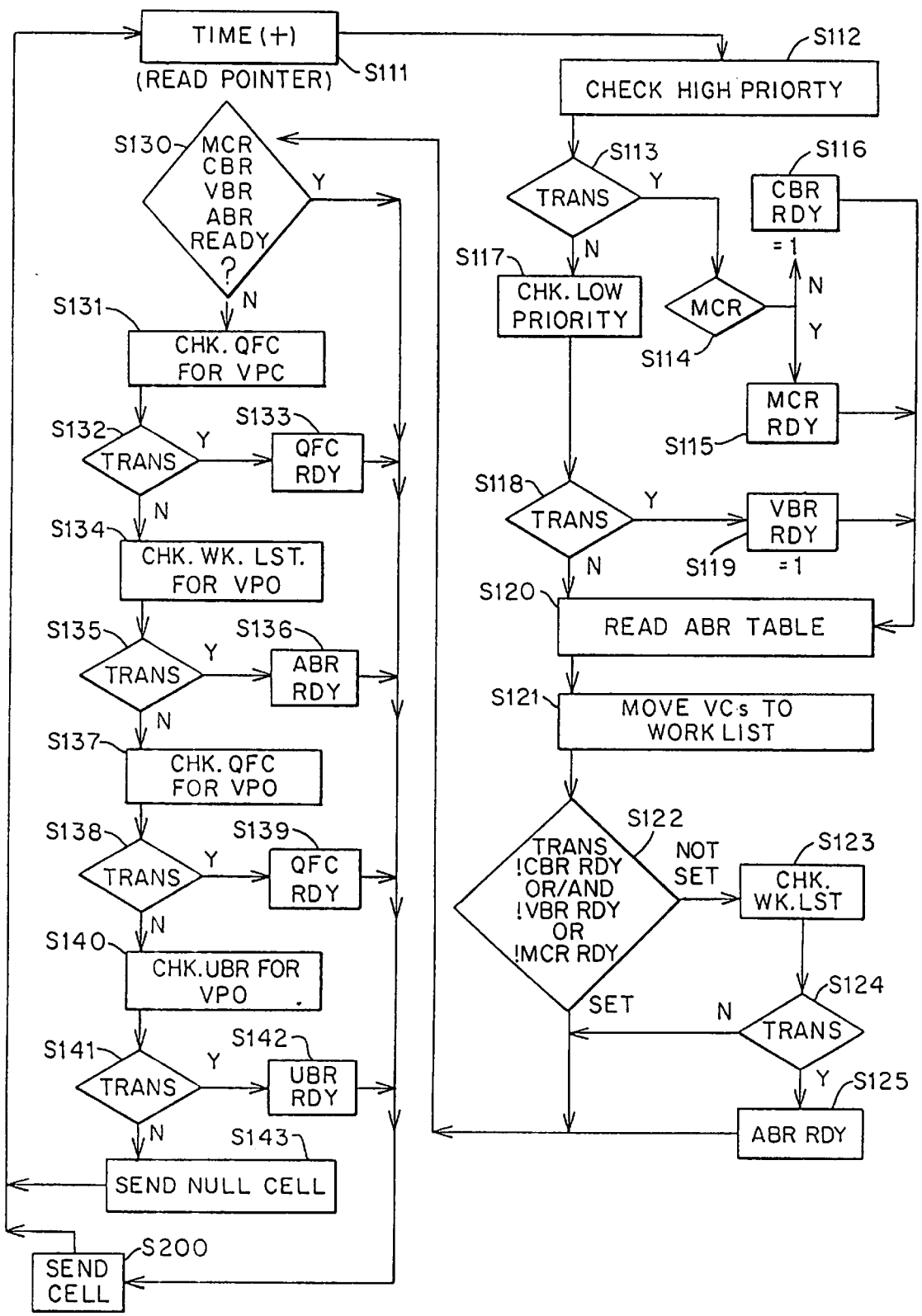
FIG. 9 is a more detailed flow chart illustrating the process flow for ATM cell transmission for a hierarchy of services and providing the minimum cell rate for ABR service, in accord with the present invention.

To ensure detailed understanding, it may be helpful to go through a specific process flow, with emphasis on the processing of the second embodiment of the scheduling tables. FIG. 9 is a flow chart illustrating this scheduling process.

The scheduler reads the pointer for the current cell transmit time (S111) and accesses the line in the static table corresponding to the indexed cell time. From the first field in the line of the static table for that time slot, the scheduler identifies the VPC assigned that time slot. The scheduler next checks the high priority field of that line (S112). The scheduler then determines if there is a VCC listed, meaning that a cell must be scheduled for transmission in this slot for the identified VCC (S113). In the preferred embodiment, if there is a VCC listed in that field, the identified VCC has a CBR or MCR service allocated to use of that time slot. Step S113 produces a branch to step S114.

As discussed above, there is a flag in high priority table if the VCC is for MCR service for an ABR type VCC. When the scheduler is examining the high priority field in the static table and finds a VCC, the scheduler also checks the MCR flag (S114). If set, the scheduler recognizes this VCC as having MCR service and sets an MCR ready bit, indicating cell transmission for MCR service (S115). The scheduler assigns this cell transmit slot to the identified ABR VCC having a non-zero MCR. If the MCR flag is not set when checked in step S114, the scheduler sets a bit indicating CBR ready and assigns this cell transmit slot to the identified CBR VCC (S116).

True CBR service does not require an ACR calculation or any flow control processing. However, the transmissions for ABR VCCs identified in the static table require calculation of the ACR for the circuit and flow control processing. Thus, when the scheduler initiates transmission for the VCC in response to an ABR listing in the high priority filed of the static table, the scheduler notes the MCR ready flag and calculates the ACR for the identified VCC circuit. The MCR ready flag also triggers flow control and reschedule processing, based in part on the ACR, as discussed above.

If the analysis in steps S1 12, S113 identified a high priority VCC, processing flows to either step S115 or step S116 and from there to step S120. However, in step S113, if the high priority field in the indexed line does not include a VCC for a CBR or MCR service, the scheduler next accesses the low priority field in the table (S117). In the preferred embodiment, the low priority fields are used to identify VCCs for variable bit rate services. In any given line of the table, there may or may not be a low priority entry. If there is an entry in this field, the scheduler checks the cell queue for the circuit identified, to determine if that circuit has a cell to send (S118). If so, the scheduler sets a bit indicating VBR ready and assigns this cell transmit slot to the identified VBR VCC (S119), and processing flows to step S120. If there is no VCC listed in the low priority field or if a VCC is listed but has no cell ready to send, then the scheduler will not set the ready bit for ABR transmission, meaning processing flows directly from step S118 to step S120.

In the illustrated embodiment, the scheduler reads the head and tail pointers from the indexed line of the static table in step S120. The head and tail pointers point to a link list of VCCs having ABR service. Using the link list, the scheduler retrieves the link list from the memory 29 and may move one or more of the VCCs contained in the particular link list to the work list for the currently identified VPC (S121). There are a number of possible algorithms that the scheduler may use to develop the work list. For example, a given link list may have some special priority requiring placement in the middle of the work list, at the top of the work list or at some other specified location on the work list. The scheduler may check to determine which circuits on the link list have a cell ready to transmit and append the VCCs to the work list only for those circuits (if any) that have a cell ready to transmit. For simplicity of discussion here, assume that the scheduler appends all of the new link list of VCCs to the bottom of the work list as in the example of FIG. 8.

The scheduler now checks the ready status (S122). If the CBR ready bit or the VBR ready bit or the MCR ready bit is set, the scheduler skips forward (to step S130), without performing any processing on the ABR work list for the indexed VPC. However, if none of those ready bits are set at this point, the scheduler looks to the work list for an ABR type VCC with a cell ready to transmit (S123).

In the current example, the scheduler checks to determine if the first VCC in this list has a cell in the queue that is ready to transmit. If the first VCC in the work list has a cell to transmit, the scheduler sets a bit indicating ABR ready and assigns this cell transmit slot to the identified ABR VCC and removes the VCC from the work list. If the first VCC identified on the work list does not have a cell ready to transmit, the scheduler removes the VCC from the work list, but it does not set the ABR-ready bit. Instead, the scheduler checks to determine if the next VCC in the work list has a cell ready to transmit. This process continues until the scheduler identifies an ABR VCC from the work list with a cell to transmit or until the scheduler completes traversal of the ABR work list for the indexed VPC without identifying a VCC that is ready to transmit (S124). If the scheduler finds a VCC having ABR service on this list with a cell to transmit, the scheduler sets the ABR-ready bit and assigns the slot to that VCC (S125). If the scheduler finds no VCC on the work list with a cell to send, the scheduler skips step S125 and proceeds to step S130.

The scheduler reaches step S130 either upon recognition of a ready status set for CBR, VBR or MCR (from S122) or upon completion of the ABR work list processing for the indexed VPC (from S124 or S125). At this point, the scheduler again checks ready status. If a ready bit is set for MCR, CBR, VBR or ABR, the scheduler jumps forward to it's transmit process in step S200 and initiates transmission of the appropriate cell.

However, if the scheduler completed the work list for the ABR traffic for the currently indexed VPC without identifying a VCC with a cell to send, there will be no ready bit set when the scheduler checks status in step S130. The scheduler next considers QFC traffic for the indexed VPC (S131, S132). The scheduler starts with the first VCC on a QFC queue for that VPC, and goes down through the QFC queue until it first finds a VCC with credit and a cell ready to transmit or until it reaches the end of that queue. If the scheduler finds a QFC service type VCC with credit and a cell ready to transmit, the scheduler sets a bit indicating QFC ready (S133). The scheduler jumps forward to it's transmit process in step S200 and initiates transmission of the appropriate cell.

However, if at step S132 the scheduler has found no VCC on the QFC queue with credit and a cell to send, the scheduler proceeds to step S134.

The scheduler may go through tables and/or work lists for other types of traffic associated with the indexed VPC. For purposes of the present discussion, it is assumed that the QFC traffic is the lowest level service in the hierarchy associated with that VPC.

The virtual path identified as VP0 has special transmit privileges. It can transmit CBR, VBR and ABR traffic as scheduled by the tables and work; list, in the same manner as the other VPCs, including ABR service with a non-zero MCR. However, VP0 may also transmit ABR or QFC traffic in cell transmit time slots designated for other VPCs, any time that the VPC identified in the VP index field of the static schedule table does not have a cell ready to transmit. In the illustrated example, it is assumed for discussion that the indexed VPC was for a connection other than VP0. After going through all of the processes for the indexed VPC (CBR, MCR, VBR, ABR and QFC in the present example), the scheduler offers the cell transmit opportunity to ABR traffic associated with VP0. The scheduler goes through the ABR work list (S134, S135) for VP0 in the same manner as for other VPCs. The scheduler identifies the first VCC (if any) on the ABR work list for VP0 with a cell that is ready to transmit, and sets the bit indicating ABR ready (S136). When the scheduler sets the ABR-ready bit during process-ing for VP0, the scheduler advances its processing to the transmission operation (S200) and sends the cell over the identified VCC for VP0.

If there is no ABR service VCC for VP0 with a cell to send, then the scheduler goes to the QFC queue for VP0 (at S137 and S138). The scheduler works down through the QFC queue for VP0 until it first finds a VCC with credit and a cell to transmit or until in reaches the end of the QFC work list. If the scheduler finds a QFC VCC with credit for cell transmission in the QFC list for VP0, the scheduler sets the bit indicating QFC ready (S139) and proceeds to the transmission operation (S200).

If the scheduler reaches the end of the QFC queue for VP0 without identifying a circuit with credit and a cell ready to transmit, the scheduler may go to a work list or queue for another type of traffic, such as flow master or unspecified bit rate (UBR) (S140, S141). If the scheduler finds a UBFR VCC ready for cell transmission in the appropriate list for VP0, the scheduler sets the bit indicating UBR ready (S142) and advances its processing to the transmission operation (S200) and sends the cell for the identified VCC for VP0.

In the present example, there may be UBR traffic for VP0 but no other traffic types, therefore if there is no UBR traffic scheduled for VP0, none of the circuits offered this cell transmit opportunity have a cell to send. Accordingly, the scheduler initiates transmission of a null cell (S143).

In step 200, if the scheduler set any of the ready bits, the scheduler uses the appropriate identification for the VCC that caused the setting of the particular ready bit and initiates transmission of the cell for that VCC. The cell transmitted includes a VP1 corresponding to the indexed VPC or VP0 and a VCI corresponding to the identified VCC, to logically place the transmitted cell in the virtual path and in the virtual circuit within that path. Thus, if the scheduler set the CBR-ready bit, the scheduler initiates transmission of the cell for the VCC identified as the CBR service VCC for this cell transmit time in the high priority field of the indexed line of the static table for the indexed VPC. If the scheduler set the MCR-ready bit, the scheduler initiates transmission of the cell for the ABR type VCC identified from the high priority field of the indexed line of the static table for the indexed VPC. If the scheduler set the VBR-ready bit, the scheduler initiates transmission of the cell for the VCC identified as the ABR service VCC for this cell transmit time in the low priority field of the indexed line of the static table for the indexed VPC. If the scheduler set the ABR-ready bit during processing of the ABR work list for the indexed VPC, then the scheduler initiates transmission of the cell for the VCC from that list. If the scheduler set the QFC-ready bit during processing of the QFC queue for the indexed VPC, then the scheduler initiates transmission of the cell for the VCC from that list. If the scheduler set the ABR-ready bit during processing of the ABR work list for VP0, then the scheduler initiates transmission of the cell for the VCC from that list. If the scheduler set the QFC-ready bit during processing of the QFC queue for VP0, then the scheduler initiates transmission of the cell for the VCC from that list. If the scheduler set the UBR-ready bit during UBR processing for VP0, then the scheduler initiates transmission of the cell for the VCC having the UBR service.

If the cell transmission was for a VCC from one of the ABR or QFC lists, the scheduler updates that list. If the VCC was selected from an ABR list, the scheduler removes the link list containing that VCC from the particular work list and moves the head and tail pointers down the ABR table for the particular VPC, to reschedule service for that VCC. Also, the scheduler similarly removes and reschedules service for any link lists passed over in the work list processing because there were no cells ready to transmit for the identified circuits. The distance down the ABR table that the scheduler moves the pointers for each link list depends on the scheduling algorithm, traffic and/or the level of ABR. service provided to the particular VCC. In particular, the distance varies depending on the MCR provided for that VCC. If the VCC was selected from a QFC list, then the scheduler moves the VCC down that queue and deducts one transmission from the credit assigned to the VCC. Periodically, the scheduler refreshes QFC credit for each VCC.

Next, the scheduler increments the cell transmit time (S111) and begins the scheduling process again. In particular, the scheduler will read the next line in the static table and begin processing for the VPC identified in that next line.

From the above discussion, it should be apparent that additional work lists can be provided to support other types of traffic, either associated with the indexed VPC, associated with VP0 or independent from any identified VPC. If the additional queue or work list process is added after the QFC processing for the indexed VPC but before VP0 processing, the list would relate to service associated with the one VPC. If added after the VP0 processing, the service may be one associated with VP0 or independent of VP. However, such a service is at the bottom end of the hierarchical scheduling process. VCCs identified in such a bottom-end process would receive service only after all CBR, MCR and VBR service checks for the indexed VPC and after offering the transmit opportunity to VCCs on the ABR work lists and QFC work lists for both the indexed VPC and VP0.

In the above discussion of the detailed flow chart (FIG. 9), it was assumed that when the scheduler processes a line of the static table, it identifies a VPC, and loads an ABR link list identified in the dynamic table for that VPC into the work list for that VPC (steps S120–S121). The dynamic table processing for ABR service therefore occurred during every cell transmit time, including any cell transmit times allocated to ABR circuits to provide MCR service. An alternative approach is to recognize that the MCR ready bit is set, and skip the dynamic table processing for ABR services, in those cell times allocated to ABR circuits to provide MCR. This would reduce the number of processing steps for cell times allocated to MCR transmissions. Also, in such an implementation, the A13R table would not include lines for cell times scheduled for MCR transmission.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of scheduling transmission of asynchronous transfer mode (ATM) cell traffic over a link, the method comprising:

statically scheduling cell transmission in a first cell transmit time for a first virtual circuit, identified by a first virtual path identifier and a first virtual circuit identifier, associated with a high priority service and associated with an available bit rate service to provide a predetermined minimum cell rate that is greater than zero;

statically scheduling cell transmission in a second cell transmit time for a second virtual circuit, identified by a second virtual path identifier and a second virtual circuit identifier, associated with a low priority service; and dynamically scheduling in said second cell transmit time cell transmission for another virtual circuit, identified by said second virtual path identifier and another virtual circuit identifier, associated with the available bit rate service in said second cell transmit time when no ATM cell carrying data is ready for transmission in said second cell transmit time for said second virtual circuit.

2. A method as in claim 1, wherein the statically scheduling said first virtual circuit associated with the available bit rate service comprises:

indexing a line of a scheduling table stored in memory for the first cell transmit time, and identifying the virtual circuit from the indexed line of the scheduling table, and the method further includes transmitting a cell in the first cell transmit time for the identified virtual circuit associated with the available bit rate service regardless whether the cell with the identified virtual circuit has data ready for transmission.

3. A method as in claim 1, wherein the dynamically scheduling the identified virtual circuit associated with the available bit rate service comprises:

indexing a line of a scheduling table stored in memory, identifying said second virtual circuit from the indexed line of the scheduling table, determining if the cell associated with said second virtual circuit has data was ready for transmission in said second cell transmit time, and identifying said another virtual circuit.

4. A method as in claim 2, wherein the scheduling table comprises one table having a plurality of lines indexed by cell transmit times for identifying said first virtual circuit associated with a constant bit rate service and for identifying said second virtual circuit associated with a variable bit rate service.

5. A method as in claim 2, wherein the scheduling table comprises:

a static scheduling table having a plurality of lines including one of the following:
 (a) said virtual path identifier and said virtual circuit identifier associated with said high priority service and
 (b) said virtual path identifier and said virtual circuit identifier associated with a low priority service; and at least one dynamic scheduling table comprising lines identifying virtual circuits associated with the available bit rate service.

6. A method as in claim 3, wherein the dynamically scheduling further comprises modifying dynamic data for identifying the virtual circuit after transmission in the second cell transmit time, to reschedule service to the identified virtual circuit.

7. A method as in claim 6, wherein the modifying of the dynamic data comprises moving the dynamic data used to identify the virtual circuit from the line of the scheduling table indexed during the first transmit time down the table a predetermined number of lines to a line of the dynamic table that may be indexed during a third cell transmit time.

8. A method as in claim 7, wherein the number of lines is determined at least in part based on the reciprocal of the difference between allowable cell rate for the virtual circuit and the predetermined minimum cell rate.

9. A method as in claim 3, wherein the dynamically scheduling further comprises:

adding an identity of the virtual circuit to a work list, and in the second cell transmit time, scheduling cell transmission for the identified virtual circuit using the work list.

10. A method as in claim 9, wherein the indexing does not occur during the first cell transmit time.

11. A device for scheduling transmission of asynchronous transfer mode (ATM) cell traffic over a link, in a plurality of cell transmit times, comprising:

means for statically scheduling cell transmission in a first cell transmit time for a first virtual circuit, identified by a first virtual path identifier and a first virtual circuit identifier, associated with a high priority service and an available bit rate service to provide a predetermined minimum cell rate that is greater than zero;

means for statically scheduling cell transmission in a second cell transmit time for a second virtual circuit, identified by a second virtual path identifier and a second virtual circuit identifier, associated with a low priority service; and means for dynamically scheduling in said second cell transmit time cell transmission for another virtual circuit, identified by said second virtual path identifier and another virtual circuit identifier, associated with the available bit rate service when no ATM cell carrying data is ready for transmission in said second cell transmit time for said second virtual circuit.

12. A device as in claim 11, comprising a scheduler included in an ATM segmentation and reassembly circuit.

13. A device as in claim 12, wherein the ATM segmentation and reassembly circuit is implemented in an ATM user network interface.

14. A device, comprising:

an asynchronous transfer mode (ATM) cell transmitter for transmitting ATM cells over a link;

a scheduler controlling transmission of cells by the ATM transmitter;

a static scheduling table stored in memory for use by the scheduler, the static scheduling table comprising a plurality of lines indexed by respective cell transmit times, each said line of the static scheduling table including a first field for data identifying a virtual circuit associated with a high priority service or an available bit rate service to provide a minimum cell rate that is greater than zero and assigned a respective cell transmit time as a transmit opportunity, the scheduler controlling the ATM transmitter arranged to send an ATM cell for each virtual circuit associated with the high priority service or the available bit rate service identified in the field of the static scheduling table line during the respective cell transmit time;

a dynamic scheduling table maintained in memory by the scheduler, the dynamic scheduling table having a plurality of lines indexed by cell transmit times, each line of the dynamic scheduling table containing data which the scheduler uses to identify at least one virtual circuit associated with the available bit rate service; and a list maintained in memory by the scheduler of one or more virtual circuits identified from processing of the dynamic scheduling table, wherein the scheduler is arranged to access the list during an available cell transmit time in which there was no cell transmission scheduled as a result of no ATM cell carrying data being ready for transmission when indexed in the static table, wherein the scheduler is arranged to use the accessed information from the lists to identify a virtual circuit associated with the available bit rate service and having an ATM cell ready to transmit, and wherein the scheduler controls the ATM transmitter to transmit a ready cell during the available cell transmit time, wherein each said line of the static scheduling table includes a second field for data identifying a virtual circuit associated with a low priority.

15. A device as in claim 14, wherein the list comprises a work list.

16. A device as in claim 15, wherein the scheduler uses data from a line of the dynamic scheduling table to add identifications of one or more virtual circuits to the work list during predetermined cell transmit times.

17. A device as in claim 14, wherein:

each line of the static scheduling table identifies one virtual path connection from among a plurality of virtual path connections which may utilize bandwidth on the link, and any virtual circuit connection identified in the field of each line of the static scheduling table is a virtual circuit connection associated with the one virtual path connection.

18. A device as in claim 17, wherein the dynamic scheduling table comprises a plurality of dynamic scheduling tables each of which is associated with one of the virtual path connections.

19. A device as in claim 18, wherein the list comprises a plurality of lists each of which is associated with one of the virtual path connections.

20. A device as in claim 14, further comprising a media access control interface for receiving data relating to a plurality of data communication services from one or more data devices; and a segmentation processor for segmenting data received via the media access control interface, for adapting the segmented data into ATM cells and supplying the ATM cells to the ATM transmitter for scheduled transmission over the ATM link.

21. A device, comprising:

an asynchronous transfer mode (ATM) cell transmitter for transmitting ATM cells over a link;

a scheduler controlling transmission of cells by the ATM transmitter;

a scheduling table stored in memory for use by the scheduler, the scheduling table comprising a plurality of lines indexed by respective cell transmit times, each line of the scheduling table including a static portion and a dynamic portion, the static portion of each line including a high priority field for data identifying a virtual circuit associated with a high priority service or an available bit rate service to provide a minimum cell rate that is greater than zero and being assigned a respective cell transmit time as a transmit opportunity, the scheduler controlling the ATM transmitter to send an ATM cell for each virtual circuit connection identified in the high priority field during the respective cell transmit time, the dynamic portion of each line may contain data which the scheduler uses to identify at least one virtual circuit associated with the available bit rate service; and a list maintained in memory by the scheduler of one or more virtual circuits identified from processing of the dynamic portion of the scheduling table, wherein the scheduler is arranged to access the list during an available cell transmit time in which there was no cell transmission scheduled as a result of no ATM cell carrying data being ready for transmission when indexed in the first cell transmit time in the static portion, the scheduler being arranged to use accessed information from the list to identify a virtual circuit associated with the available bit rate service and having an ATM cell ready to transmit, and the scheduler being arranged to control the ATM transmitter to transmit the ready cell during the available cell transmit time, wherein each said line of the scheduling table includes a low priority field for data identifying a virtual circuit associated with a low priority service.

22. A device as in claim 21 including the scheduler, wherein each said line of the scheduling table identifiers one virtual path from among a plurality of virtual paths for utilizing a bandwidth on the link and wherein any virtual circuit identified in the field of the static portion of a line of the scheduling table is a virtual circuit connection associated with the one virtual path connection.

23. A device as in claim 22, wherein any virtual circuit connection identified using the data from the dynamic portion of a line of the scheduling table is a virtual circuit connection associated with the one virtual path connection.

24. A device as in claim 22, wherein the list comprises a plurality of work lists each of which is associated with one of the virtual path connections.

25. A device as in claim 21, further comprising a media access control interface for receiving data relating to a plurality of data communication services from one or more data devices; and a segmentation processor for segmenting data received via the media access control interface, for adapting the segmented data into the ATM cells and supplying the ATM cells to the ATM transmitter for scheduled transmission over the ATM link.

26. A method of scheduling available bit rate traffic and other traffic over an asynchronous transfer mode (ATM) link in a sequence of cell transmit times, the method comprising:

(a) during each cell transmit time, identifying one virtual path connection that is assigned the cell transmit time from among a plurality of virtual path connections that may utilize bandwidth on the link;

(b) during each cell transmit time, determining from static scheduling information if there is a high priority virtual circuit connection that is assigned a first cell transmit time from among a plurality of high priority virtual circuit connections associated with the one virtual path connection, (c) in each cell transmit time in which there is a high priority virtual circuit connection assigned, transmitting a cell for the assigned high priority virtual circuit connection over the link, determining if the high priority virtual circuit connection has available bit rate service, and if so executing a flow control procedure for that high priority virtual circuit connection;

(d) during at least some of the cell transmit times, accessing dynamic scheduling information to identify at least one available bit rate service virtual circuit connection from among a plurality of available bit rate service virtual circuit connections associated with the one virtual path connection, and adding an identity of the at least one available bit rate service virtual circuit connection to a work list, wherein one of the available bit rate virtual circuit connections identified in the dynamic scheduling information is the high priority virtual circuit connection having available bit rate service; and (e) during any cell transmit time in which there is no cell transmitted for a high priority virtual circuit connection, accessing the work list to identify an available bit rate service virtual circuit connection having a cell ready, and transmitting the cell for the identified available bit rate service virtual circuit connection over the link.

27. A method as in claim 26, further comprising the step of rescheduling a cell transmit opportunity for any available bit rate service virtual circuit connection that transmits a cell, for future addition to the work list in accord with a predetermined scheduling algorithm.

28. A method as in claim 27, wherein the predetermined scheduling algorithm is based at least in part on the difference between the bandwidth allocated to one virtual path connection and total minimum cell rate bandwidth for virtual circuit connections within that virtual path connection.

29. A method as in claim 27, wherein the predetermined scheduling algorithm is based at least in part on the reciprocal of the difference between allowable cell rate and minimum cell rate, for the high priority virtual circuit connection having available bit rate service.

30. A method as in claim 26, wherein the dynamic scheduling table comprises a plurality of scheduling tables each of which is associated with one of the virtual path connections, and the work list comprises a plurality of work lists each of which is associated with one of the virtual path connections.

31. A method as in claim 1, wherein the high priority service is a constant bit rate service.

32. A device as in claim 11, wherein the high priority service is a constant bit rate service.

33. A device as in claim 14, wherein the high priority service is a constant bit rate service.

34. A device as in claim 21, wherein the high priority service is a constant bit rate service.

35. A method as in claim 1, wherein the low priority service is a variable bit rate service.

36. A device as in claim 11, wherein the low priority service is a variable bit rate service.

* * * * *